US012701373B2

United States Patent

(12) United States Patent
Yang et al.

(10) Patent No.: US 12,701,373 B2
(45) Date of Patent: Aug. 4, 2026

(54) FREQUENCY RESPONSE CONSISTENCY CALIBRATION METHOD AND ELECTRONIC DEVICE

(71) Applicant: HONOR DEVICE CO., LTD., Shenzhen (CN)

(72) Inventors: Xiao Yang, Shenzhen (CN); Jianfeng Xu, Shenzhen (CN); Chienfeng Yeh, Shenzhen (CN); Qi Wu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 159 days.

(21) Appl. No.: 18/700,318

(22) PCT Filed: Sep. 13, 2022

(86) PCT No.: PCT/CN2022/118558

§ 371 (c)(1),
(2) Date: Apr. 11, 2024

(87) PCT Pub. No.: WO2023/103503

PCT Pub. Date: Jun. 15, 2023

(65) Prior Publication Data

US 2024/0406647 A1 Dec. 5, 2024

(30) Foreign Application Priority Data

Dec. 10, 2021 (CN) ......................... 202111509124.9

(51) Int. Cl.
*H04R 29/00* (2006.01)
*H04R 3/04* (2006.01)
*H04S 7/00* (2006.01)

(52) U.S. Cl.
CPC ............. *H04R 29/001* (2013.01); *H04R 3/04* (2013.01); *H04S 7/301* (2013.01); *H04R 2430/01* (2013.01)

(58) Field of Classification Search
CPC ........ H04R 3/04; H04R 29/00; H04R 29/001; H04S 7/301
(Continued)

(56) References Cited

U.S. PATENT DOCUMENTS

| | | | | |
|---|---|---|---|---|
| 11,888,456 | B2 * | 1/2024 | Shaya | H03G 5/165 |
| 12,156,013 | B2 * | 11/2024 | Noirot | H04R 5/02 |

(Continued)

FOREIGN PATENT DOCUMENTS

| | | | |
|---|---|---|---|
| CN | 106165452 | A | 11/2016 |
| CN | 107682802 | A | 2/2018 |

(Continued)

*Primary Examiner* — Disler Paul
(74) *Attorney, Agent, or Firm* — Fish & Richardson P.C.

(57) ABSTRACT

Embodiments of this application provide a frequency response consistency calibration method and an electronic device, to solve a problem that when a screen sound production component of an electronic device plays a sound signal, a frequency response curve of the sound signal greatly fluctuates. The frequency response consistency calibration method includes: An electronic device plays a test audio signal. The electronic device stores a calibration parameter. The calibration parameter is a running parameter of an equalizer calibration module. The calibration parameter is determined based on a frequency response of a first audio signal and a standard frequency response of the test audio signal. The first audio signal is obtained by a calibration device by acquiring the test audio signal played by the electronic device. The calibration parameter is used to adjust a frequency response of the second audio signal played by the electronic device.

20 Claims, 12 Drawing Sheets

(58) Field of Classification Search
USPC .................................................... 381/58–59
See application file for complete search history.

(56) References Cited

U.S. PATENT DOCUMENTS

| | | | | |
|---|---|---|---|---|
| 2006/0153404 | A1 | 7/2006 | Gardner | |
| 2007/0217619 | A1* | 9/2007 | Hall | H03G 5/025 381/59 |
| 2008/0037805 | A1 | 2/2008 | Kino et al. | |
| 2010/0272270 | A1 | 10/2010 | Chaikin et al. | |
| 2013/0315405 | A1 | 11/2013 | Kanishima et al. | |
| 2014/0342783 | A1 | 11/2014 | Suzuki et al. | |
| 2017/0150265 | A1 | 5/2017 | Ikeda | |
| 2019/0090079 | A1 | 3/2019 | Lee et al. | |

FOREIGN PATENT DOCUMENTS

| | | | |
|---|---|---|---|
| CN | 109245739 | A | 1/2019 |
| CN | 109274909 | A | 1/2019 |
| CN | 109275084 | A | 1/2019 |
| CN | 112185324 | A | 1/2021 |
| CN | 112927705 | A | 6/2021 |
| CN | 113076075 | A | 7/2021 |
| CN | 113282265 | A | 8/2021 |
| CN | 113573213 | A | 10/2021 |
| EP | 3040695 | B1 | 6/2019 |
| JP | 2008294493 | A | 12/2008 |
| KR | 102254522 | B1 | 5/2021 |
| TW | I746207 | B | 11/2021 |

* cited by examiner (a)

(b)

(a)

(b)

FREQUENCY RESPONSE CONSISTENCY CALIBRATION METHOD AND ELECTRONIC DEVICE

CROSS-REFERENCE TO RELATED APPLICATIONS

This application is a national stage of International Application No. PCT/CN2022/118558, filed on Sep. 13, 2022, which claims priority to Chinese Patent Application No. 202111509124.9, filed on Dec. 10, 2021. The disclosures of the aforementioned applications are hereby incorporated by reference in their entireties.

TECHNICAL FIELD

This application relates to the field of audio technologies, and in particular, to a frequency response consistency calibration method and an electronic device.

BACKGROUND

Currently, a large quantity of electronic devices have a voice communication function or an audio playback function, for example, a mobile phone or a tablet. To implement the voice communication function or the audio playback function, a sound production component needs to be mounted in the electronic device to enable a user to hear voice of the other party in a call or audio played through the electronic device. With a requirement of the electronic device on a screen-to-body ratio of a screen, holes in a front panel (that is, the screen) of the electronic device need to be reduced. Therefore, a screen sound production component (for example, a piezoelectric ceramic capacitive component) is generally disposed in the electronic device as a speaker or an earpiece of the electronic device.

However, for the electronic device that produces a sound through the screen sound production component, the screen sound production component needs to be attached to the screen of the electronic device during assembling of the screen sound production component, and there is an error after the screen sound production component is attached to the screen of the electronic device. In addition, screens of different screen manufacturers are different in the size and quality: Due to these problems, when the screen sound production component of the electronic device plays a sound signal, a frequency response curve of the sound signal greatly fluctuates and deviates from a standard frequency response curve, leading to hearing inconsistency of the user and affecting user experience.

SUMMARY

Embodiments of this application provide a frequency response consistency calibration method and an electronic device, to solve a problem that when a screen sound production component of an electronic device plays a sound signal, a frequency response curve of the sound signal greatly fluctuates.

To achieve the foregoing objective, the following technical solutions are used in embodiments of this application:

A first aspect provides a frequency response consistency calibration method. The method is applied to an electronic device. The electronic device includes an equalizer calibration module. The electronic device is in communication connection to a calibration device. The method includes: The electronic device plays a test audio signal. The electronic device stores a calibration parameter. The calibration parameter is a running parameter of the equalizer calibration module. The calibration parameter is determined based on a frequency response of a first audio signal and a standard frequency response of the test audio signal. The first audio signal is obtained by the calibration device by acquiring the test audio signal played by the electronic device. The calibration parameter is used to adjust, through the equalizer calibration module when the electronic device plays a second audio signal, a frequency response of the second audio signal played by the electronic device.

Based on the method, a sound signal played by the electronic device before calibration is acquired to obtain the first audio signal, and the calibration parameter of the equalizer calibration module is determined based on the frequency response of the first audio signal and the standard frequency response of the test audio signal. The calibration parameter is used to adjust smoothness of a frequency response curve when the electronic device plays a normal audio signal, to reduce a difference between the frequency response curve of the actually played audio signal and a standard frequency response curve and improve quality of the audio signal played by the electronic device, to improve hearing experience of a user.

In a possible implementation, after the electronic device plays the test audio signal, the method may further include: The electronic device receives the first audio signal. The electronic device determines the calibration parameter based on the frequency response of the first audio signal and the standard frequency response of the test audio signal. The calibration parameter may be determined by the electronic device. After acquiring the first audio signal, the calibration device may send the first audio signal to the electronic device, so that the electronic device calculates and determines the calibration parameter. In this way, the calibration device can be simplified, and development of the calibration device is facilitated.

In a possible implementation, after the electronic device plays the test audio signal, the method may further include: The electronic device receives the calibration parameter. The calibration parameter is determined by the calibration device based on the frequency response of the first audio signal and the standard frequency response of the test audio signal. That is, the calibration parameter may alternatively be determined by the calibration device. The calibration parameter may be obtained through detection before delivery of the electronic device, so that determining the calibration parameter by the calibration device can avoid program instructions for determining the calibration parameter occupying storage space of the electronic device.

In a possible implementation, that the electronic device plays a test audio signal includes: In response to the electronic device receiving a detection instruction sent by the calibration device, the electronic device plays the test audio signal; or in response to the electronic device sending the detection instruction to the calibration device, the electronic device plays the test audio signal.

In a possible implementation, the test audio signal is a frequency sweeping signal in full frequency domain. Signals in full frequency domain need to be calibrated during frequency response calibration, to ensure good hearing experience when a screen sound production component of the electronic device plays any audio signal.

In a possible implementation, the frequency response of the first audio signal is obtained by performing time-frequency transform on the first audio signal.

In a possible implementation, the equalizer calibration module includes a plurality of sub-band filters. The calibration parameter is parameters of the plurality of sub-band filters. The calibration parameter includes a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band. The screen sound production component such as a capacitive component has a nonlinear characteristic, so that a frequency response of an audio signal played by the electronic device can be calibrated through a plurality of stages of equalization filters (that is, the plurality of sub-band filters), to achieve higher frequency response consistency and provide better hearing experience for the user.

In a possible implementation, the electronic device further includes an equalizer parameter calculation module. That the electronic device determines the calibration parameter based on the frequency response of the first audio signal and the standard frequency response of the test audio signal includes: The electronic device determines, through the equalizer parameter calculation module based on the frequency response of the first audio signal and the standard frequency response of the test audio signal, a frequency point required to be calibrated, a quantity of frequency points required to be calibrated, and a frequency response gain corresponding to the frequency point required to be calibrated. The electronic device determines, through the equalizer parameter calculation module, the calibration parameter based on the frequency point required to be calibrated, the quantity of frequency points required to be calibrated, and the frequency response gain corresponding to the frequency point required to be calibrated.

In a possible implementation, the frequency point required to be calibrated is a frequency point at which a difference between the frequency response of the first audio signal and the standard frequency response of the test audio signal exceeds a preset frequency response gain. The frequency response gain corresponding to the frequency point required to be calibrated is a difference between the frequency response of the first audio signal and the standard frequency response of the test audio signal at the frequency point required to be calibrated.

In a possible implementation, if the quantity of frequency points required to be calibrated is less than or equal to N, the quantity of to-be-calibrated frequency bands is N. Central frequency points of the N to-be-calibrated frequency bands are N frequency points at which differences between the frequency response of the first audio signal and the frequency response of the test audio signal are greatest. A filter type corresponding to each to-be-calibrated frequency band is a peak filter. A central frequency of a filter corresponding to each to-be-calibrated frequency band is a frequency corresponding to a central frequency point of the to-be-calibrated frequency band. A frequency response gain of the filter corresponding to each to-be-calibrated frequency band is a difference between the frequency response of the first audio signal and the standard frequency response of the test audio signal at the central frequency point of the to-be-calibrated frequency band. N is a preset minimum quantity of sub-bands supported to be calibrated.

In a possible implementation, if the quantity of frequency points required to be calibrated is greater than N and less than or equal to M, the quantity of to-be-calibrated frequency bands is the quantity of frequency points required to be calibrated. A filter type corresponding to each to-be-calibrated frequency band is a peak filter. A central frequency of a filter corresponding to each to-be-calibrated frequency band is a frequency corresponding to each frequency point required to be calibrated. A frequency response gain of the filter corresponding to each to-be-calibrated frequency band is a frequency response gain corresponding to each frequency point required to be calibrated. N is a preset smallest quantity of sub-bands supported to be calibrated. M is a preset largest quantity of sub-bands supported to be calibrated.

In a possible implementation, if the quantity of frequency points required to be calibrated is greater than M, the quantity of to-be-calibrated frequency bands is N. The to-be-calibrated frequency band is obtained by combining a part of the frequency points required to be calibrated. In the to-be-calibrated frequency bands, except a lowest to-be-calibrated frequency band a highest to-be-calibrated frequency band, a filter type corresponding to each to-be-calibrated frequency band is a peak filter. A central frequency of a filter corresponding to each to-be-calibrated frequency band is a frequency corresponding to a central frequency point of the to-be-calibrated frequency band. A frequency response gain of the filter corresponding to each to-be-calibrated frequency band is an average gain of frequency response gains corresponding to all frequency points required to be calibrated in each to-be-calibrated frequency band.

In a possible implementation, if the quantity of frequency points required to be calibrated is greater than M, the quantity of to-be-calibrated frequency bands is N. The to-be-calibrated frequency band is obtained by combining a part of the frequency points required to be calibrated. In a lowest to-be-calibrated frequency band of the N to-be-calibrated frequency bands, if a lowest frequency point of the lowest to-be-calibrated frequency band is f1, and a quantity of frequency points required to be calibrated in the lowest to-be-calibrated frequency band is greater than or equal to a first threshold, a filter type corresponding to the lowest to-be-calibrated frequency band is a low shelf filter. A central frequency of a filter corresponding to the lowest to-be-calibrated frequency band is a frequency corresponding to a highest frequency point of the lowest to-be-calibrated frequency band. A frequency response gain corresponding to the lowest to-be-calibrated frequency band is an average gain of frequency response gains corresponding to a plurality of frequency points required to be calibrated in the lowest to-be-calibrated frequency band. In a lowest to-be-calibrated frequency band of the N to-be-calibrated frequency bands, if a lowest frequency point of the lowest to-be-calibrated frequency band is greater than f1, or a quantity of frequency points required to be calibrated in the lowest to-be-calibrated frequency band is less than a first threshold, a filter type corresponding to the lowest to-be-calibrated frequency band is a peak filter. A central frequency of a filter corresponding to the lowest to-be-calibrated frequency band is a frequency corresponding to a central frequency point of the lowest to-be-calibrated frequency band. A frequency response gain corresponding to the lowest to-be-calibrated frequency band is an average gain of frequency response gains corresponding to all frequency points required to be calibrated in the lowest to-be-calibrated frequency band, where f1 is a preset lowest frequency required to be calibrated.

In a possible implementation, if the quantity of frequency points required to be calibrated is greater than M, a quantity of filters is N. The to-be-calibrated frequency band is obtained by combining a part of the frequency points required to be calibrated. In a highest to-be-calibrated frequency band of the N to-be-calibrated frequency bands, if a highest frequency point of the highest to-be-calibrated frequency band is f2, and a quantity of frequency points required to be calibrated in the highest to-be-calibrated frequency band is greater than or equal to a second threshold, a filter type corresponding to the highest to-be-calibrated frequency band is a high shelf filter. A central frequency of a filter corresponding to the highest to-be-calibrated frequency band is a frequency corresponding to a lowest frequency point of the highest to-be-calibrated frequency band. A frequency response gain corresponding to the highest to-be-calibrated frequency band is an average gain of frequency response gains corresponding to a plurality of frequency points required to be calibrated in the highest to-be-calibrated frequency band. In a highest to-be-calibrated frequency band of the N to-be-calibrated frequency bands, if a highest frequency point of the highest to-be-calibrated frequency band is less than f2, or a quantity of frequency points required to be calibrated in the highest to-be-calibrated frequency band is less than a first threshold, a filter type corresponding to the highest to-be-calibrated frequency band is a peak filter. A central frequency of a filter corresponding to the highest to-be-calibrated frequency band is a frequency corresponding to a central frequency point of the highest to-be-calibrated frequency band. A frequency response gain corresponding to the highest to-be-calibrated frequency band is an average gain of frequency response gains corresponding to all frequency points required to be calibrated in the highest to-be-calibrated frequency band, where f2 is a preset highest frequency required to be calibrated.

A second aspect provides another frequency response consistency calibration method. The method is applied to a calibration device. The calibration device is in communication connection to an electronic device. The method includes: in a process in which the electronic device plays a test audio signal, acquiring a sound signal played by the electronic device to obtain a first audio signal: determining a calibration parameter based on a frequency response of the first audio signal and a standard frequency response of the test audio signal, where the calibration parameter is used to adjust, when the electronic device plays a second audio signal, a frequency response of the sound signal played by the electronic device; and sending the calibration parameter to the electronic device.

In a possible implementation, the calibration device includes an artificial ear. The acquiring a sound signal played by the electronic device includes: in response to receiving a detection instruction sent by the electronic device, acquiring, through the artificial ear, the sound signal played by the electronic device: or in response to sending a detection instruction to the electronic device, acquiring, through the artificial ear, the sound signal played by the electronic device. The detection instruction instructs the electronic device to play the test audio signal.

In a possible implementation, the test audio signal is a frequency sweeping signal in full frequency domain.

In a possible implementation, the frequency response of the first audio signal is obtained by performing time-frequency transform on the first audio signal.

In a possible implementation, an equalizer calibration module includes a plurality of sub-band filters. The calibration parameter includes a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band.

In a possible implementation, the determining a calibration parameter based on a frequency response of the first audio signal and a standard frequency response of the test audio signal includes: determining, based on the frequency response of the first audio signal and the standard frequency response of the test audio signal, a frequency point required to be calibrated, a quantity of frequency points required to be calibrated, and a frequency response gain corresponding to the frequency point required to be calibrated; and determining the calibration parameter based on the frequency point required to be calibrated, the quantity of frequency points required to be calibrated, and the frequency response gain corresponding to the frequency point required to be calibrated.

In a possible implementation, the frequency point required to be calibrated is a frequency point at which a difference between the frequency response of the first audio signal and the standard frequency response of the test audio signal exceeds a preset frequency response gain. The frequency response gain corresponding to the frequency point required to be calibrated is a difference between the frequency response of the first audio signal and the standard frequency response of the test audio signal at the frequency point required to be calibrated.

In a possible implementation, if the quantity of frequency points required to be calibrated is less than or equal to N, the quantity of to-be-calibrated frequency bands is N. Central frequency points of the N to-be-calibrated frequency bands are N frequency points at which differences between the frequency response of the first audio signal and the frequency response of the test audio signal are greatest. A filter type corresponding to each to-be-calibrated frequency band is a peak filter. A central frequency of a filter corresponding to each to-be-calibrated frequency band is a frequency corresponding to a central frequency point of the to-be-calibrated frequency band. A frequency response gain of the filter corresponding to each to-be-calibrated frequency band is a difference between the frequency response of the first audio signal and the standard frequency response of the test audio signal at the central frequency point of the to-be-calibrated frequency band. N is a preset minimum quantity of sub-bands supported to be calibrated.

In a possible implementation, if the quantity of frequency points required to be calibrated is greater than N and less than or equal to M, the quantity of to-be-calibrated frequency bands is the quantity of frequency points required to be calibrated. A filter type corresponding to each to-be-calibrated frequency band is a peak filter. A central frequency of a filter corresponding to each to-be-calibrated frequency band is a frequency corresponding to each frequency point required to be calibrated. A frequency response gain of the filter corresponding to each to-be-calibrated frequency band is a frequency response gain corresponding to each frequency point required to be calibrated. N is a preset smallest quantity of sub-bands supported to be calibrated. M is a preset largest quantity of sub-bands supported to be calibrated.

In a possible implementation, if the quantity of frequency points required to be calibrated is greater than M, the quantity of to-be-calibrated frequency bands is N. The to-be-calibrated frequency band is obtained by combining a part of the frequency points required to be calibrated. In the to-be-calibrated frequency bands, except a lowest to-be-calibrated frequency band a highest to-be-calibrated frequency band, a filter type corresponding to each to-be-calibrated frequency band is a peak filter. A central frequency of a filter corresponding to each to-be-calibrated frequency band is a frequency corresponding to a central frequency point of the to-be-calibrated frequency band. A frequency response gain of the filter corresponding to each to-be-calibrated frequency band is an average gain of frequency response gains corresponding to all frequency points required to be calibrated in each to-be-calibrated frequency band.

In a possible implementation, if the quantity of frequency points required to be calibrated is greater than M, the quantity of to-be-calibrated frequency bands is N. The to-be-calibrated frequency band is obtained by combining a part of the frequency points required to be calibrated. In a lowest to-be-calibrated frequency band of the N to-be-calibrated frequency bands, if a lowest frequency point of the lowest to-be-calibrated frequency band is f1, and a quantity of frequency points required to be calibrated in the lowest to-be-calibrated frequency band is greater than or equal to a first threshold, a filter type corresponding to the lowest to-be-calibrated frequency band is a low shelf filter. A central frequency of a filter corresponding to the lowest to-be-calibrated frequency band is a frequency corresponding to a highest frequency point of the lowest to-be-calibrated frequency band. A frequency response gain corresponding to the lowest to-be-calibrated frequency band is an average gain of frequency response gains corresponding to a plurality of frequency points required to be calibrated in the lowest to-be-calibrated frequency band. In a lowest to-be-calibrated frequency band of the N to-be-calibrated frequency bands, if a lowest frequency point of the lowest to-be-calibrated frequency band is greater than f1, or a quantity of frequency points required to be calibrated in the lowest to-be-calibrated frequency band is less than a first threshold, a filter type corresponding to the lowest to-be-calibrated frequency band is a peak filter. A central frequency of a filter corresponding to the lowest to-be-calibrated frequency band is a frequency corresponding to a central frequency point of the lowest to-be-calibrated frequency band. A frequency response gain corresponding to the lowest to-be-calibrated frequency band is an average gain of frequency response gains corresponding to all frequency points required to be calibrated in the lowest to-be-calibrated frequency band, where f1 is a preset lowest frequency required to be calibrated.

In a possible implementation, if the quantity of frequency points required to be calibrated is greater than M, a quantity of filters is N. The to-be-calibrated frequency band is obtained by combining a part of the frequency points required to be calibrated. In a highest to-be-calibrated frequency band of the N to-be-calibrated frequency bands, if a highest frequency point of the highest to-be-calibrated frequency band is f2, and a quantity of frequency points required to be calibrated in the highest to-be-calibrated frequency band is greater than or equal to a second threshold, a filter type corresponding to the highest to-be-calibrated frequency band is a high shelf filter. A central frequency of a filter corresponding to the highest to-be-calibrated frequency band is a frequency corresponding to a lowest frequency point of the highest to-be-calibrated frequency band. A frequency response gain corresponding to the highest to-be-calibrated frequency band is an average gain of frequency response gains corresponding to a plurality of frequency points required to be calibrated in the highest to-be-calibrated frequency band. In a highest to-be-calibrated frequency band of the N to-be-calibrated frequency bands, if a highest frequency point of the highest to-be-calibrated frequency band is less than f2, or a quantity of frequency points required to be calibrated in the highest to-be-calibrated frequency band is less than a first threshold, a filter type corresponding to the highest to-be-calibrated frequency band is a peak filter. A central frequency of a filter corresponding to the highest to-be-calibrated frequency band is a frequency corresponding to a central frequency point of the highest to-be-calibrated frequency band. A frequency response gain corresponding to the highest to-be-calibrated frequency band is an average gain of frequency response gains corresponding to all frequency points required to be calibrated in the highest to-be-calibrated frequency band, where f2 is a preset highest frequency required to be calibrated.

A third aspect provides an audio playback method. The audio playback method is applied to an electronic device, the electronic device includes an equalizer calibration module and a screen sound production component. The method includes: receiving an audio playback instruction, where the audio playback instruction instructs the electronic device to play a second audio signal: obtaining a calibration parameter in response to receiving the audio playback instruction, where the calibration parameter is a calibration parameter stored in the electronic device according to the method in any possible implementation of the first aspect; adjusting a frequency response of the second audio signal through the equalizer calibration module by using the calibration parameter, to obtain a third audio signal; and playing the third audio signal through the screen sound production component.

A fourth aspect provides a calibration system. The calibration system includes an electronic device and a calibration device. The electronic device is in communication connection to the calibration device. The electronic device is configured to perform the method in any possible implementation of the first aspect.

A fifth aspect provides a calibration device. The calibration device is in communication connection to an electronic device. The calibration device includes a calibration control module, an equalizer parameter calculation module, and an artificial ear. The calibration control module is configured to send a detection instruction to the electronic device. The detection instruction instructs the electronic device to play a test audio signal. The artificial ear is configured to: in a process in which the electronic device plays the test audio signal, acquire the test audio signal played by the electronic device to obtain a first audio signal. The equalizer parameter calculation module is configured to determine a calibration parameter based on a frequency response of the first audio signal and a standard frequency response of the test audio signal. The calibration parameter is used to adjust, when the electronic device plays a second audio signal, a frequency response of the sound signal played by the electronic device. The calibration control module is further configured to send the calibration parameter to the electronic device.

In a possible implementation, the test audio signal is a frequency sweeping signal in full frequency domain.

In a possible implementation, the frequency response of the first audio signal is obtained by performing time-frequency transform on the first audio signal.

In a possible implementation, the calibration parameter includes a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band.

In a possible implementation, the equalizer parameter calculation module is specifically configured to: determine, based on the frequency response of the first audio signal and the standard frequency response of the test audio signal, a frequency point required to be calibrated, a quantity of frequency points required to be calibrated, and a frequency response gain corresponding to the frequency point required to be calibrated; and determine the calibration parameter based on the frequency point required to be calibrated, the quantity of frequency points required to be calibrated, and the frequency response gain corresponding to the frequency point required to be calibrated.

In a possible implementation, the frequency point required to be calibrated is a frequency point at which a difference between the frequency response of the first audio signal and the standard frequency response of the test audio signal exceeds a preset frequency response gain. The frequency response gain corresponding to the frequency point required to be calibrated is a difference between the frequency response of the first audio signal and the standard frequency response of the test audio signal at the frequency point required to be calibrated.

A sixth aspect provides a calibration device. The calibration device includes a processor and a memory: The memory stores one or more computer programs. The one or more computer programs include instructions. When the instructions are executed by the processor, the calibration device is enabled to perform the method according to any possible implementation of the second aspect.

A seventh aspect provides an electronic device. The electronic device includes one or more processors, a memory, and a communication module. The communication module is configured to communicate with a calibration device. The memory stores one or more computer programs. The one or more computer programs include instructions. When the instructions are executed by the processor, the electronic device is enabled to perform the method in any possible implementation of the first aspect and the third aspect.

An eighth aspect provides a chip system. The chip system includes one or more interface circuits and one or more processors. The interface circuit is connected to the processor through a line. The chip system may be used in an electronic device including a communication module and a memory. The interface circuit may read instructions stored in the memory of the electronic device, and send the instructions to the processor. When the instructions are executed by the processor, the electronic device may be enabled to perform the method in any possible implementation of the first aspect, or a calibration device may be enabled to perform the method in any possible implementation of the second aspect.

A ninth aspect provides a computer-readable storage medium. The computer-readable storage medium stores instructions. When the instructions run on a calibration device, the calibration device is enabled to perform the method in any possible implementation of the second aspect.

A tenth aspect provides a computer-readable storage medium. The computer-readable storage medium stores instructions. When the instructions run on a calibration device, the electronic device is enabled to perform the method in any possible implementation of the first aspect and the third aspect.

It may be understood that for technical effects brought by any possible implementation of the second aspect to the tenth aspect, reference may be made to technical effects brought by different implementations of the first aspect. Details are not described herein again.

DESCRIPTION OF EMBODIMENTS

Figure 1:
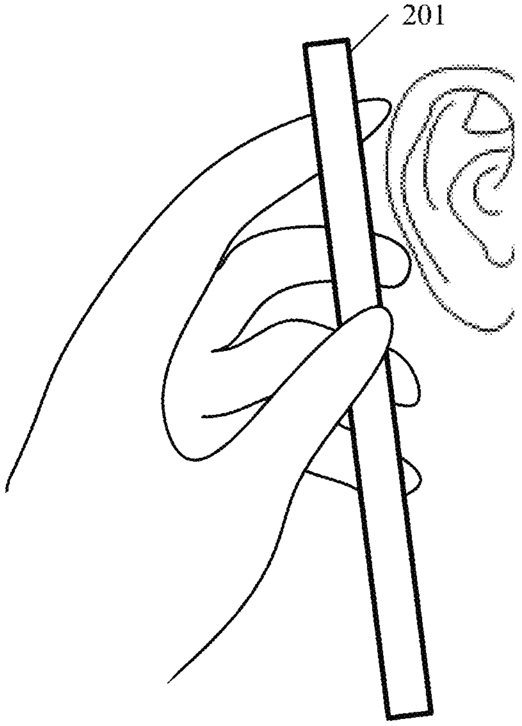
FIG. 1 is a schematic diagram of a scenario in which a user performs voice communication through an electronic device according to an embodiment of this application.

For ease of understanding, some descriptions of concepts related to embodiments of this application are provided as examples for reference, which are shown as follows.

Capacitive component: Generally, a load with a capacitive parameter (that is, a load matched with a characteristic that a voltage lags behind a current) may be referred to as a capacitive load or capacitive component. A load of the capacitive component in an electronic system may be equivalent to capacitance. For example, a micro-electro-mechanical system (micro-electro-mechanical system, MEMS), a thin film material, and an electrostatic speaker are all capacitive components. A voltage of the capacitive component does not suddenly change during charging/discharging.

Technical solutions in embodiments of this application are described below with reference to the accompanying drawings in embodiments of this application. In the description of this application, unless otherwise specified, “at least one” means one or more, and “a plurality of” means two or more. In addition, to clearly describe the technical solutions in embodiments of this application, words such as “first” and “second” are used in embodiments of this application to distinguish between same items or similar items that have basically a same function and effect. A person skilled in the art may understand that words such as “first” and “second” do not limit a quantity and an execution order, and the words “first” and “second” are not necessarily different.

Currently, a large quantity of electronic devices have a voice communication function or an audio playback function. To implement the voice communication function, a sound production component needs to be mounted in the electronic device to enable a user to hear voice of the other party during voice communication. Similarly, to implement the audio playback function, the sound production component also needs to be mounted in the electronic device. An example in which the electronic device such as a mobile phone implements the voice communication function is used. An earpiece (also referred to as a speaker) is disposed at a top of the mobile phone as a sound production component for voice communication, to implement the voice communication function. Generally, the earpiece is disposed inside the mobile phone, and a sound outlet needs to be formed in a front panel of the mobile phone. When the earpiece produces a sound, sound energy produced by the earpiece can be transmitted through the sound outlet, so that a user can hear the sound produced by the earpiece. However, with continuous development of the mobile phone, to provide the user with better screen viewing experience, a screen-to-body ratio of a screen of the mobile phone is increasingly high. Because the sound outlet disposed in the front panel occupies a partial region of the front panel of the mobile phone, a width of a frame of the mobile phone is increased, which affects an increase of the screen-to-body ratio of the mobile phone.

With development of large-screen and full-screen mobile phones, an area occupied by the sound outlet of the earpiece in the front panel of the mobile phone needs to be reduced, to increase the screen-to-body ratio of the mobile phone. For example, the sound outlet of the earpiece of the mobile phone is designed as a long seam shape, and the sound outlet is located at a joint (also referred to as a mobile phone side seam) between a middle frame and the front panel of the mobile phone. In some cases, a hole may also be formed in a top of the middle frame of the mobile phone as a sound outlet, to ensure a good sound output effect of the sound outlet of the earpiece of the mobile phone. In this case, when the user uses the mobile phone to perform voice communication, the auricle of the user cannot completely cover and wrap the sound outlet, and the sound energy of the earpiece of the mobile phone cannot be completely transmitted to the auricle of the user, leading to sound leakage.

For example, the mobile phone is used as an example. In a process in which the user holds the mobile phone to perform voice communication through the earpiece, the earpiece of the mobile phone is configured to play a sound signal of a peer user in a voice communication process (that is, the earpiece of the mobile phone is the foregoing speaker configured to make a voice call in voice communication). As shown in FIG. 1, a sound outlet 201 of the earpiece of the mobile phone is close to the ear (or the auricle) of the user. In this case, because the sound outlet 201 of the earpiece of the mobile phone (for example, the sound outlet in the side seam of the mobile phone and the sound outlet in the top of the middle frame) cannot be completely covered and wrapped by the ear of the user, a sound signal sent by the sound outlet 201 can not only be heard by the user, but also heard by another user in a quiet environment, leading to sound leakage.

Figure 2:
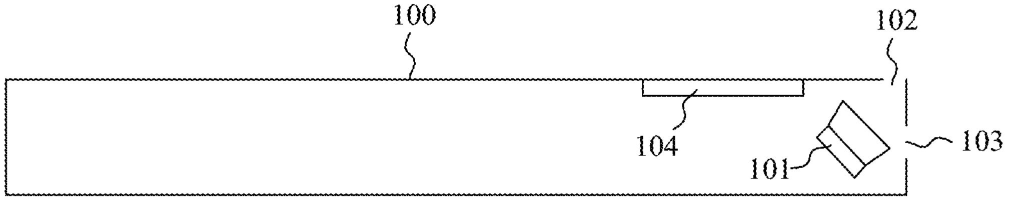
FIG. 2 is a schematic diagram of a structure of an electronic device according to an embodiment of this application.
Figure 2:
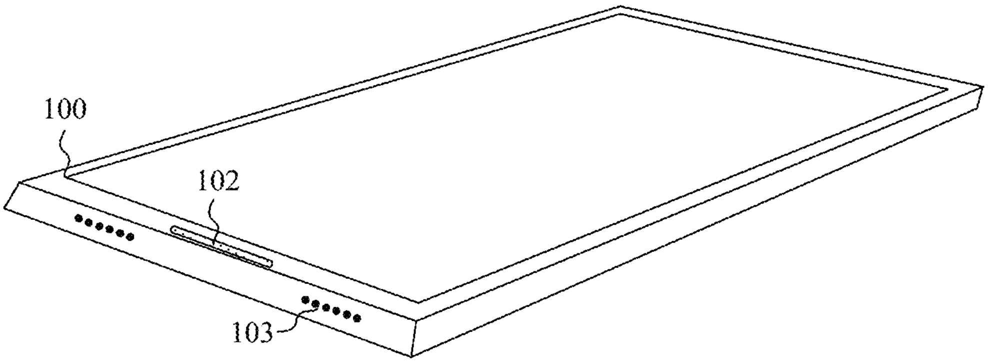

To avoid sound leakage during sound production of the earpiece, some electronic devices use screen sound production instead of earpiece sound production, or use both screen sound production and earpiece sound production. For example, FIG. 2 is a schematic diagram of a structure of the electronic device. The electronic device includes a housing structure 100. The housing structure 100 is enclosed by a front panel (including a screen and a frame), a rear panel configured to support an internal circuit, and a middle frame. As shown in (a) in FIG. 2, an earpiece 101 and a screen sound production component 104 are disposed in the housing structure 100 of the electronic device. The earpiece 101, also referred to as a receiver, is a speaker configured to make a voice call in voice communication, and is generally disposed at a top location of the housing structure. The screen sound production component 104 may be a vibration source connected to a lower part of a screen. With reference to (b) in FIG. 2, corresponding to the earpiece 101, the electronic device is provided with two sound outlets: a sound outlet 102 and a sound outlet 103. The sound outlet 102 is at a location (that is, a location of a side seam) at which the front panel and the middle frame of the electronic device are connected. The sound outlet 103 is at a location that is on the middle frame of the electronic device and that is close to the earpiece (that is, a top location of the middle frame of the electronic device). In this way, the electronic device shown in FIG. 2 can produce a sound through the earpiece, produce a sound through the screen, or produce a sound through the earpiece and the screen, to avoid sound leakage occurring when producing the sound through only the earpiece.

It should be understood that specific structures of the screen sound production component in the electronic device are different for different screen sound production solutions. For example, the screen sound production component may be a vibration source (for example, a piezoelectric ceramic, a motor vibrator, an exciter, or another vibration unit) connected to the back of the screen. The vibration source may vibrate under control of a current signal, to drive the screen to vibrate, thereby implementing screen sound production. For another example, the screen sound production component may be a piezoelectric ceramic that is fixed to the middle frame of the electronic device through a cantilever structure. The piezoelectric ceramic may vibrate under control of a current signal, and transmit the vibration to the screen through the middle frame of the mobile phone, to drive the screen to vibrate, thereby implementing screen sound production. For another example, the screen sound production component may alternatively be an exciter fixed to the middle frame of the electronic device. The exciter may vibrate under control of a current signal, and transmit the vibration to the screen through the middle frame of the mobile phone, to drive the screen to vibrate, thereby implementing screen sound production. For another example, the screen sound production component may alternatively be split magnetic levitation oscillators. One of the split magnetic levitation oscillators is fixed to the middle frame of the electronic device, and the other oscillator is fixed to the screen. The oscillator that can be fixed to the screen vibrates relative to the oscillator that is fixed to the middle frame of the electronic device and under control of a current signal, to drive the screen to vibrate, thereby implementing screen sound production.

However, for the electronic device (for example, the mobile phone) that produces a sound through the screen sound production component (for example, a capacitive component like the piezoelectric ceramic), the screen sound production component needs to be attached to the lower part of the screen of the mobile phone during assembling of the screen sound production component. Generally, there may be a specific error range after the screen sound production component is attached to the screen of the mobile phone. In addition, screens of different mobile phone screen manufacturers may have some differences in the size and quality. When the electronic device is used, all these problems may make high a discrete degree of a frequency response curve generated when the screen sound production component produces a sound, leading to high and low pitches and the like. As a result, poor hearing experience is brought to the user.

To resolve the foregoing problems, an embodiment of this application provides a frequency response consistency calibration method for the screen sound production component (for example, the capacitive component like the piezoelectric ceramic). Before delivery of the electronic device, a frequency sweeping signal (that is, a test audio signal) is played to detect a frequency response curve generated when the screen sound production component of the electronic device produces a sound, and the detected frequency response curve is compared with a standard frequency response curve to obtain a plurality of key frequency points required to be adjusted and in the frequency response curve of the screen sound production component and a calibration parameter for adjusting the key frequency points during sound production of the screen sound production component of the electronic device. The plurality of key frequency points required to be adjusted and the calibration parameter for adjusting the key frequency points are stored in a memory. An equalizer calibration module may further be added to an audio playback channel of the electronic device. Before a to-be-played audio signal is played through the screen sound production component, a key frequency point of the audio signal is first enhanced and suppressed through the equalizer calibration module, to adjust smoothness of the frequency response curve generated during sound production of the screen sound production component. In this way, a frequency response curve of the audio signal finally output through the screen sound production component is within a preset delivery threshold range. Therefore, reliability and stability of the electronic device are improved, and user experience is improved.

The following describes, with reference to the accompanying drawings, the frequency response consistency calibration method provided in this embodiment of this application.

For example, the electronic device in embodiments of this application may be a device with the voice communication function, for example, a mobile phone, a tablet computer, an ultra-mobile personal computer (ultra-mobile personal computer, UMPC), a netbook, a cellular phone, a personal digital assistant (personal digital assistant, PDA), or a wearable device (for example, a smartwatch or a smart band). A specific form of the electronic device is not specifically limited in embodiments of this application.

Figure 3:
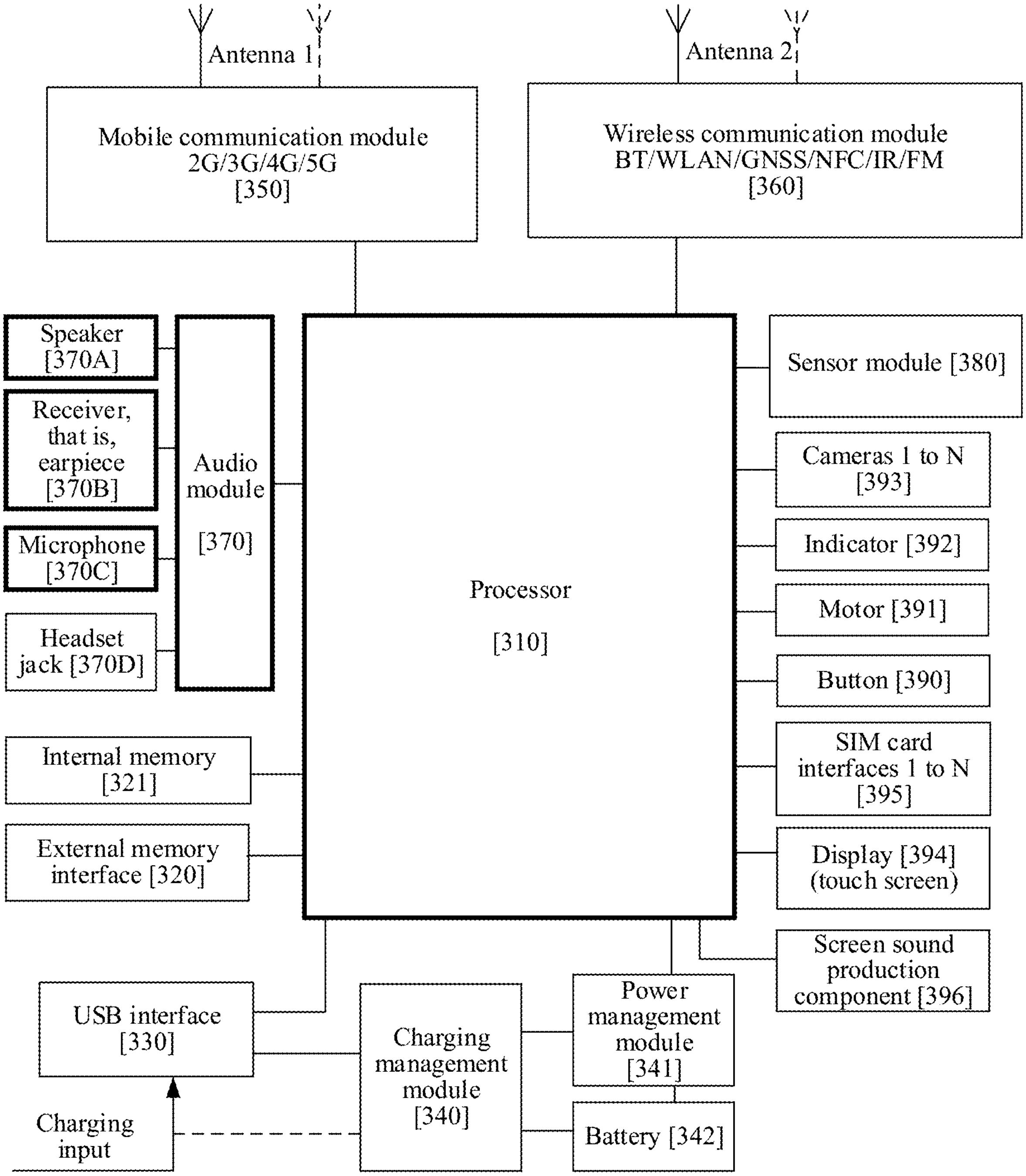
FIG. 3 is a schematic diagram of a structure of another electronic device according to an embodiment of this application.

For example, the electronic device is a mobile phone. FIG. 3 is a schematic diagram of a structure of another electronic device according to an embodiment of this application. That is, for example, the electronic device shown in FIG. 3 may be a mobile phone.

As shown in FIG. 3, the mobile phone may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver (that is, an earpiece) 370B, a microphone 370C, a headset jack 370D, a sensor module 380, a button 390, a motor 391, an indicator 392, a camera 393, a display 394, a subscriber identity module (subscriber identification module, SIM) card interface 395, a screen sound production component 396, and the like.

The sensor module may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure illustrated in this embodiment does not constitute a specific limitation on the mobile phone. In some other embodiments, the mobile phone may include more or fewer components than those shown in the figure, some components may be combined, some components may be split, or the components are arranged in different manners. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated in one or more processors.

The controller may be a nerve center and a command center of the mobile phone. The controller may generate an operation control signal based on an instruction operation code and a timing signal, to implement control on instruction fetching and execution.

The DSP may include a smart power amplifier (smart PA) hardware circuit, a smart PA algorithm module, and an audio algorithm module. The smart PA hardware circuit may be separately connected to the application processor and the screen sound production component (for example, a piezoelectric ceramic), and is configured to control the screen sound production component to produce a sound according to an instruction of the application processor. The smart PA algorithm module includes an equalizer calibration module. A plurality of stages of filters may be disposed in the equalizer calibration module. Different types of filters with different parameters work together to adjust a frequency response curve during sound production of the screen sound production component.

It should be understood that the smart PA hardware circuit may alternatively be disposed outside the DSP chip. This is not specifically limited in this embodiment of this application.

The memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access, reduces waiting time of the processor 310, and improves system efficiency. In this embodiment of this application, the memory may be configured to store a calibration parameter for adjusting consistency of the frequency response curve of the screen sound production component.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in this embodiment is merely an example for description and does not constitute a limitation on the structure of the mobile phone. In some other embodiments, the mobile phone may alternatively use an interface connection manner different from that in the foregoing embodiment, or use a combination of a plurality of interface connection manners.

The charging management module 340 is configured to receive a charging input from a charger (for example, a wireless charger or a wired charger) to charge the battery 342. The power management module 341 is configured to connect the battery 342, the charging management module 340, and the processor 310. The power management module 341 receives an input of the battery 342 and/or an input of the charging management module 340, to supply power to the components in the electronic device.

A wireless communication function of the mobile phone may be implemented through the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

In some embodiments, in the mobile phone, the antenna 1 is coupled to the mobile communication module 350, and the antenna 2 is coupled to the wireless communication module 360, so that the mobile phone may communicate with a network and another device by using a wireless communication technology. The mobile communication module 350 may provide a solution, applied to the mobile phone, to wireless communication including 2G, 3G, 4G, 5G, and the like. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering and amplification on the received electromagnetic wave, and transmit a processed electromagnetic wave to the modem processor for demodulation.

The mobile communication module 350 may further amplify a signal obtained by the modem processor through modulation, and convert the signal into an electromagnetic wave through the antenna 1 for radiation. In some embodiments, at least some function modules of the mobile communication module 350 may be disposed in the processor 310. In some embodiments, at least some function modules of the mobile communication module 350 may be disposed in a same component as at least some modules of the processor 310.

The wireless communication module 360 may provide a solution, applied to the mobile phone, to wireless communication including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like.

The wireless communication module 360 may be one or more components integrating at least one communication processing module. The wireless communication module 360 receives an electromagnetic wave through the antenna 2, performs frequency modulation and filtering processing on an electromagnetic wave signal, and sends a processed signal to the processor 310. The wireless communication module 360 may further receive a to-be-sent signal from the processor 310, perform frequency modulation and amplification on the signal, and convert the signal into an electromagnetic wave through the antenna 2 for radiation.

Certainly, the wireless communication module 360 may also support the mobile phone in performing voice communication. For example, the mobile phone may access a Wi-Fi network through the wireless communication module 360, and then interact with another device by using any application that can provide a voice communication service, to provide a user with the voice communication service. For example, the application that can provide the voice communication service may be an instant messaging application.

The mobile phone may implement a display function through the GPU, the display 394, the application processor, and the like. The GPU is a microprocessor for image processing, and is connected to the display 394 and the application processor. The GPU is configured to perform mathematical and geometric computation for graphic rendering. The processor 310 may include one or more GPUs, and the GPU executes program instructions to generate or change display information. The display 394 is configured to display an image, a video, and the like.

The mobile phone may implement a photographing function through the ISP, the camera 393, the video codec, the GPU, the display 394, the application processor, and the like. The ISP is configured to process data fed back by the camera 393. In some embodiments, the ISP may be disposed in the camera 393. The camera 393 is configured to capture a static image or a video. In some embodiments, the mobile phone may include one or N cameras 393, where N is a positive integer greater than 1.

The external memory interface 320 may be configured to connect an external storage card, for example, a micro SD card, to extend a storage capability of the mobile phone. The internal memory 321 may be configured to store computer-executable program code. The executable program code includes instructions. The processor 310 runs the instructions stored in the internal memory 321, to perform various function applications and data processing of the mobile phone. For example, in this embodiment of this application, the processor 310 may execute the instructions stored in the internal memory 321. The internal memory 321 may include a program storage region and a data storage region.

The mobile phone may implement an audio function, for example, music playback and recording, through the audio module 370, the speaker 370A, the receiver (that is, the earpiece) 370B, the microphone 370C, the headset interface 370D, the application processor, and the like.

The audio module 370 is configured to convert a digital audio signal into an analog audio signal for output, and is further configured to convert an analog audio input into a digital audio signal. The audio module 370 may further be configured to encode and decode an audio signal. In some embodiments, the audio module 370 may be disposed in the processor 310, or some function modules of the audio module 370 may be disposed in the processor 310. The speaker 370A, also referred to as "horn", is configured to convert an electrical audio signal into a sound signal. The receiver 370B, also referred to as the "earpiece", is configured to convert an electrical audio signal into a sound signal. The microphone 370C, also referred to as "voice tube" or a "mike", is configured to convert a sound signal into an electrical signal. The headset jack 370D is configured to connect a wired headset. The headset jack 370D may be the USB interface 330, or may be a 3.5 mm open mobile electronic device platform (open mobile terminal platform, OMTP) standard interface or cellular telecommunications industry association of the USA (cellular telecommunications industry association of the USA, CTIA) standard interface.

The receiver (that is, the "earpiece") 370B may be the earpiece 101 shown in (a) in FIG. 2.

For example, in this embodiment of this application, the audio module 370 may convert electrical audio signals received by the mobile communication module 350 and the wireless communication module 360 into sound signals. The receiver (that is, the "earpiece") 370B of the audio module 370 plays the sound signal, and the screen sound production component 396 drives the screen (that is, the display) to perform screen sound production to play the sound signal.

The button 390 includes a power button, a volume button, and the like. The motor 391 may generate a vibration prompt. The indicator 392 may be an indicator light, and may be configured to indicate a charging status and a power change, or may be configured to indicate a message, a missed call, a notification, and the like. The SIM card interface 395 is configured to connect a SIM card. The mobile phone may support one or N SIM card interfaces, where N is a positive integer greater than 1.

Certainly, it may be understood that FIG. 3 is merely an example for description when a device form of the electronic device is a mobile phone. If the electronic device is in another device form, for example, a tablet computer, a handheld computer, a PDA, or a wearable device (for example, a smartwatch or a smart band), the structure of the electronic device may include fewer structures than those shown in FIG. 3, or may include more structures than those shown in FIG. 3. This is not limited herein.

Figure 4:
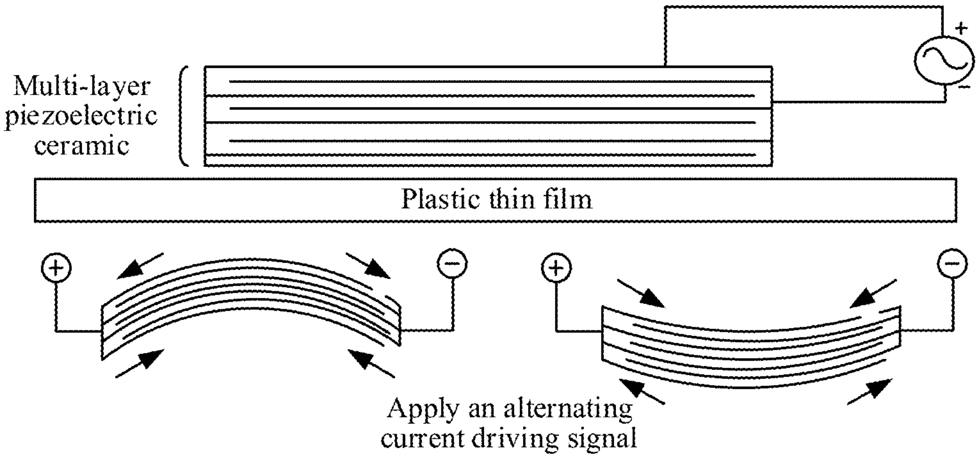
FIG. 4 is a schematic diagram of sound production of a screen sound production component according to an embodiment of this application.

FIG. 4 is a schematic diagram of sound production of the screen sound production component. The screen sound production component includes a multi-layer piezoelectric ceramic. The multi-layer piezoelectric ceramic forms a vibration film, and after an alternating current driving signal is applied, bending deformation can be performed to drive the vibration film to produce a sound under a piezoelectric effect.

Figure 5:
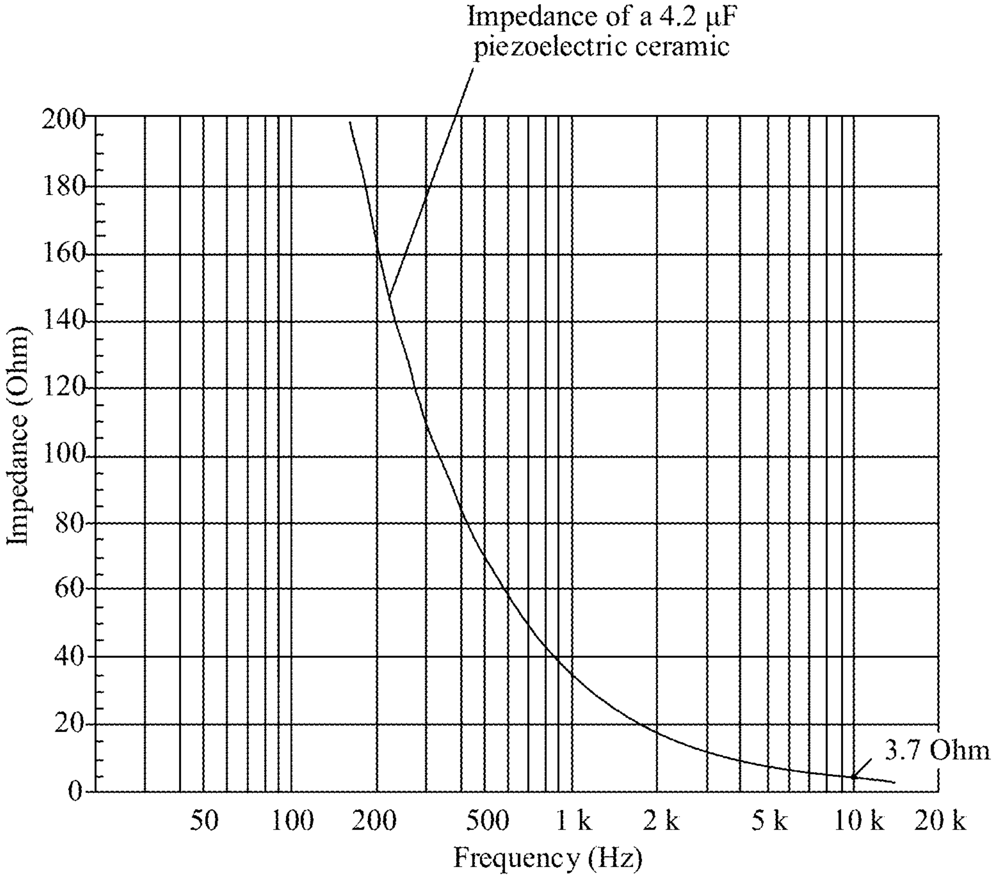
FIG. 5 is a graph of a frequency resistance characteristic of a 4.2-microfarad piezoelectric ceramic according to an embodiment of this application.

Generally, impedance of the piezoelectric ceramic (that is, the screen sound production component) satisfies the following relationship:

$$z = \frac{1}{2\pi fC},$$

where z is the impedance of the piezoelectric ceramic, C is capacitance, and f is a frequency of the alternating current signal. It can be seen that equivalent impedance of the piezoelectric ceramic dramatically decreases with an increase of the frequency of the input alternating current signal. For example, FIG. 5 shows a frequency impedance characteristic curve of a 4.2-microfarad piezoelectric ceramic. Equivalent impedance of the 4.2-microfarad (μF) piezoelectric ceramic is approximately 160 ohms (Ohm) when the frequency of the alternating current signal is 200 hertz (Hz). The equivalent impedance of the 4.2-microfarad (μF) piezoelectric ceramic is approximately 3.7 ohms (Ohm) when the frequency of the alternating current signal is 10 k hertz (Hz).

It should be noted that actually, the screen sound production component formed of the multi-layer piezoelectric ceramic includes not only the piezoelectric ceramic, but also an electrode lead, a dielectric material, another component, and the like. Therefore, equivalent impedance of the screen sound production component formed of the multi-layer piezoelectric ceramic presents a non-linear curve, and is related to a temperature, a frequency, a material, and the like.

For adaptation to a nonlinear characteristic of the screen sound production component, the equalizer calibration module is added to the audio playback channel of the electronic device, and the equalizer calibration module is implemented by a plurality of stages of equalization filters. That is, the equalizer calibration module usually includes N sub-band filters. For example, N may be a positive integer between 6 and 12.

Each sub-band filter may have the following parameters.

A system sampling rate fs: The system sampling rate is determined by a processor model used by the electronic device. For example, the system sampling rate may be 48000 Hz, 44100 Hz, or 16000 Hz.

A central frequency f0: It is a passband frequency f0 of the filter. Generally, f0=(f1+f2)/2. For example, f1 and f2 may be left and right side frequency points of the band-pass filter that are 1 dB or 3 dB lower. In this embodiment of this application, the central frequency of the filter may be determined based on a to-be-calibrated frequency point in the frequency response curve of the audio signal.

A peak bandwidth Q: It is also referred to as a quality factor Q of the filter. The quality factor Q of the filter is obtained by dividing a filter bandwidth BW by the central frequency f0 of the filter. The filter bandwidth is a spectral width that the filter is required to pass. That is, the filter bandwidth BW=(f2−f1), where f1 and f2 are the left and right side frequency points that are 1 dB or 3 dB lower than the central frequency f0 of the band-pass filter. That is, the quality factor of the filter is Q=f0/(f2−f1).

A peak gain (gain): In this embodiment of this application, the peak gain may be determined based on a difference between the frequency response curve of the audio signal and the standard frequency response curve at the to-be-calibrated frequency point or a central frequency point of a frequency band.

A filter type: It is, for example, a peak filter (Peak Filter), a low shelf filter (low shelf filter, LS), a high shelf filter (high shelf filter, HS), a low-pass filter (low-pass filter, LP), a high-pass filter (high-pass filter, HP), or a band-pass filter (band-pass filter, BP).

Figure 6:
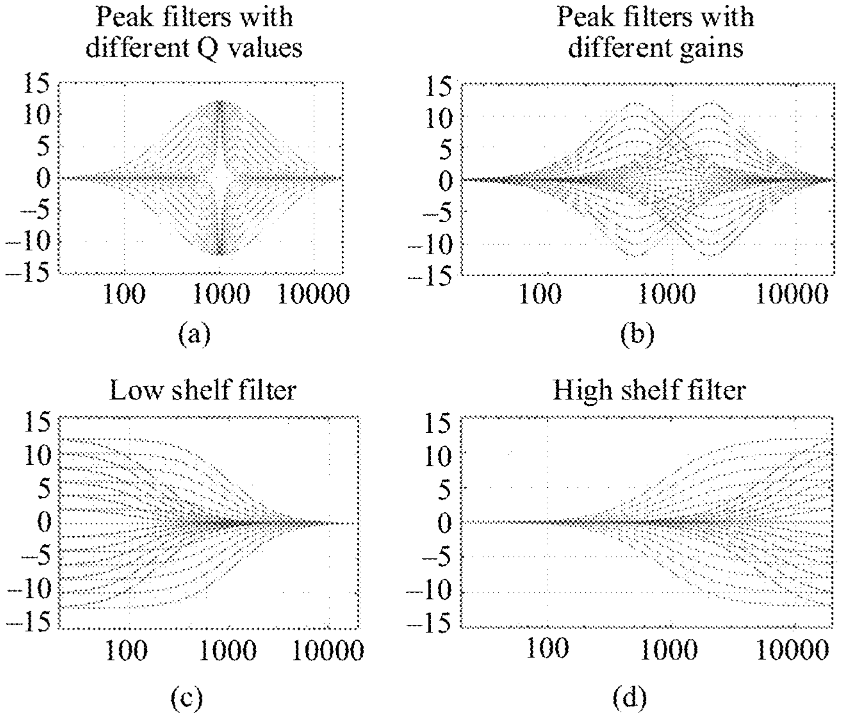
FIG. 6 is a schematic diagram of functions of different types of filters with different parameters according to an embodiment of this application.

FIG. 6 is a schematic diagram of functions of different types of filters with different parameters. For peak filters with different Q values, the Q value of the filter determines a bandwidth of the filter. When the Q value of the filter is smaller, the bandwidth is smaller, and a smaller frequency range is affected. As shown in (a) in FIG. 6, in illustrated curves from a central region to left and right sides, a Q value of the innermost curve is largest, and a Q value of the outermost curve is smallest. For peak filters with different gains, a higher gain indicates a higher gain or attenuation degree. In filter curves shown in (b) in FIG. 6, gains of the curves are sequentially 12 dB, 10 dB, 8 dB, 6 dB, 4 dB, and 2 dB from outside to inside. As shown in (c) in FIG. 6, the low shelf filter is mainly configured to increase or attenuate an amplitude of a low-frequency part. As shown in (d) in FIG. 6, the high shelf filter is mainly configured to increase or attenuate an amplitude of a high-frequency part.

A filter order: It is, for example, a first-order filter, a second-order filter, or a third-order filter. A coefficient of a filter of each sub-band may be calculated based on the foregoing parameters of the filter of each sub-band. A second-order IIR filter is used as an example. Coefficients of the second-order IIR filter include a(0), a(1), a(2), b(0), b(1), and b(2).

In summary, in the foregoing parameters of each sub-band filter, the central frequency, the peak bandwidth, the peak gain, and the filter type of the filter may all be obtained based on comparison between an uncalibrated frequency response curve and the standard frequency response curve.

After the parameters of the filter are obtained, the coefficient of the filter may be obtained through calculation based on filters of different orders and different types. The following describes, with an example, a method for calculating filter coefficients of different types of filters.

A method for calculating coefficients of a second-order IIR peak filter.

Known parameters include the central frequency f0, the peak gain (gain), the peak bandwidth Q, and the system sampling rate fs.

Intermediate variables are:

$$A = sqrt(10 ** (\text{gain}/20));$$

$$w0 = 2 * pi * f0/fs; \text{ and}$$

$$\text{alpha} = \sin(w0)/(2 * Q).$$

The following filter coefficients are obtained through calculation:

$$b0 = 1 + \text{alpha} * A;$$

$$b1 = -2 * \cos(w0);$$

$$b2 = 1 - \text{alpha} * A;$$

-continued $$a0 = 1 + \text{alpha}/A;$$

$$a1 = -2 * \cos(w0); \text{ and}$$

$$a2 = 1 - \text{alpha}/A.$$

A method for calculating coefficients of a second-order IIR low shelf filter.

Known parameters include the central frequency f0, the peak gain (gain), the peak bandwidth Q, and the system sampling rate fs.

Intermediate variables are:

$$A = sqrt(10 ** (\text{gain}/20));$$

$$w0 = 2 * pi * f0/fs; \text{ and}$$

$$\text{alpha} = \sin(w0)/(2 * Q).$$

The following filter coefficients are obtained through calculation:

$$b0 = A * ((A + 1) - (A - 1) * \cos(w0) + 2 * sqrt(A) * \text{alpha});$$

$$b1 = 2 * A * ((A - 1) - (A + 1) * \cos(w0));$$

$$b2 = A * ((A + 1) - (A - 1) * \cos(w0) - 2 * sqrt(A) * \text{alpha});$$

$$a0 = (A + 1) + (A - 1) * \cos(w0) + 2 * sqrt(A) * \text{alpha};$$

$$a1 = -2 * ((A - 1) + (A + 1) * \cos(w0)); \text{ and}$$

$$a2 = (A + 1) + (A - 1) * \cos(w0) - 2 * sqrt(A) * \text{alpha}.$$

A method for calculating coefficients of a second-order IIR high shelf filter.

Known parameters include the central frequency f0, the peak gain (gain), the peak bandwidth Q, and the system sampling rate fs.

Intermediate variables are:

$$A = sqrt(10 ** (\text{gain}/20));$$

$$w0 = 2 * pi * f0/fs; \text{ and}$$

$$\text{alpha} = \sin(w0)/(2 * Q).$$

The following filter coefficients are obtained through calculation:

$$b0 = A * ((A + 1) - (A - 1) * \cos(w0) + 2 * sqrt(A) * \text{alpha});$$

$$b1 = 2 * A * ((A - 1) - (A + 1) * \cos(w0));$$

$$b2 = A * ((A + 1) - (A - 1) * \cos(w0) - 2 * sqrt(A) * \text{alpha});$$

$$a0 = (A + 1) + (A - 1) * \cos(w0) + 2 * sqrt(A) * \text{alpha};$$

$$a1 = -2 * ((A - 1) + (A + 1) * \cos(w0)); \text{ and}$$

$$a2 = (A + 1) + (A - 1) * \cos(w0) - 2 * sqrt(A) * \text{alpha}.$$

After the coefficients of the filter are obtained, an output signal of the filter of each sub-band may be obtained through the following formula (I) based on an input signal of the filter and the coefficients of the filter.

$$y(n) = \frac{b(0)\cdot x(n) + b(1)\cdot x(n-1) + b(2)\cdot x(n-2) - a(1)\cdot y(n-1) - a(2)\cdot y(n-2)}{a(0)} \quad \text{Formula (I)}$$

y(n) is an output obtained after a signal of an $n^{th}$ sampling point passes through the filter. x(n) is the signal of the $n^{th}$ sampling point input to the filter.

The following uses an example in which the electronic device is a mobile phone, and with reference to a system architecture and a flowchart, describes in detail the frequency response curve consistency calibration method provided in this embodiment of this application.

Figure 7:
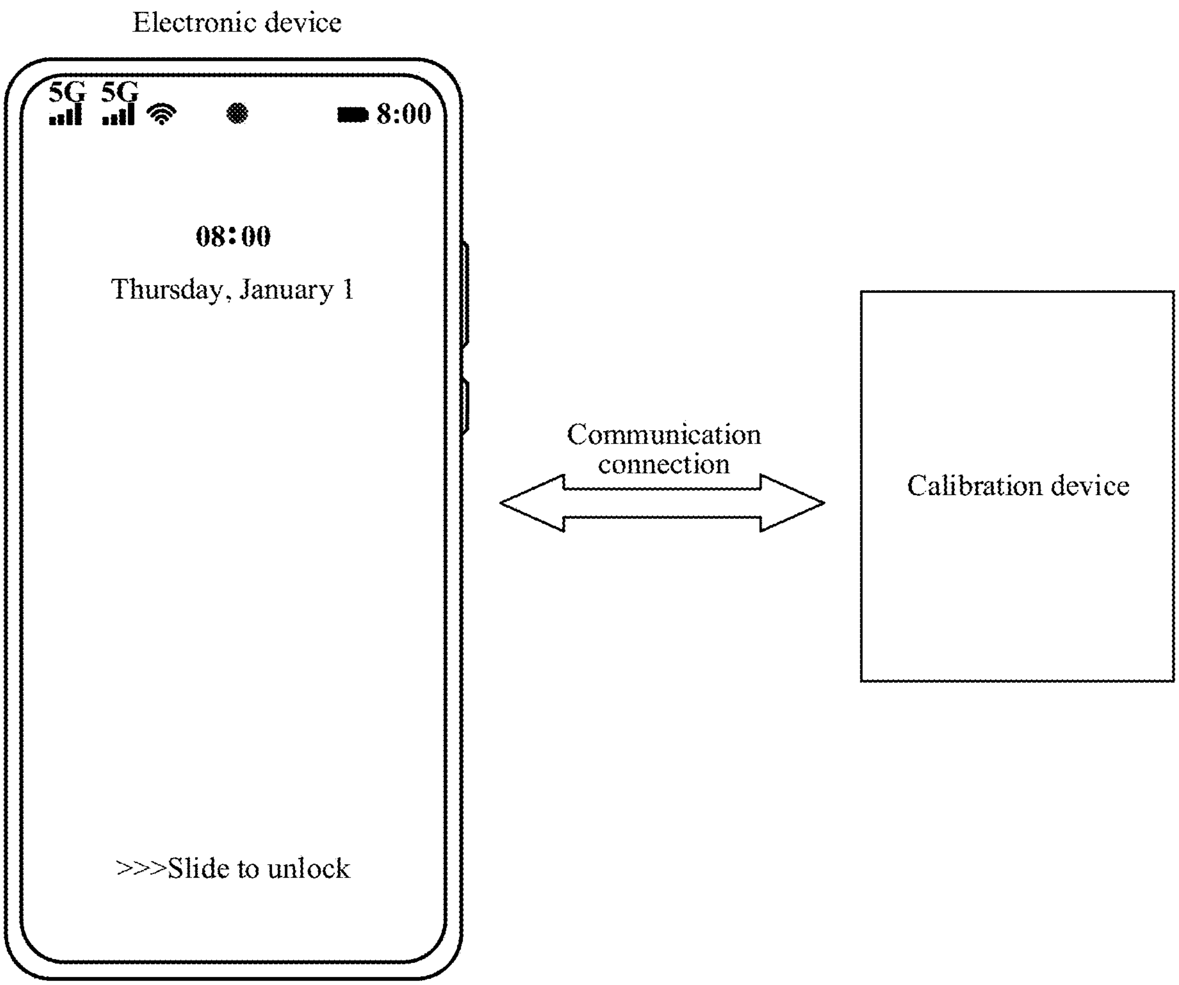
FIG. 7 is a schematic diagram of a structure of a calibration system according to an embodiment of this application.

FIG. 7 is a schematic diagram of a structure of a calibration system according to an embodiment of this application. As shown in FIG. 7, the calibration system may include an electronic device and a calibration device. On a production line, when consistency calibration needs to be performed on a frequency response curve of a screen sound production component in the electronic device, the electronic device may be in communication connection to the calibration device. After the to-be-calibrated electronic device is in communication connection to the calibration device, the electronic device is configured to play a test audio signal through the screen sound production component of the electronic device. The calibration device is configured to: when the electronic device plays the test audio signal, acquire the test audio signal played by the electronic device to obtain a first audio signal.

After the calibration device completes acquiring the test audio signal played by the electronic device, the to-be-calibrated electronic device or the calibration device may analyze the acquired first audio signal to obtain a frequency response corresponding to the first audio signal. In addition, the frequency response corresponding to the first audio signal may be compared with a standard frequency response of the test audio signal to obtain a frequency point required to be calibrated, a frequency response gain corresponding to the frequency point required to be calibrated, and a quantity of frequency points required to be calibrated. The to-be-calibrated electronic device or the calibration device may further determine, based on the frequency point required to be calibrated, the frequency response gain corresponding to the frequency point required to be calibrated, and the quantity of frequency points required to be calibrated, a calibration parameter such as a quantity of filters, a filter type, a central frequency of a filter, a gain of the filter, and a Q value of the filter. After obtaining the calibration parameter, the to-be-calibrated electronic device or the calibration device may store the calibration parameter to a non-volatile storage device of the electronic device, so that the electronic device adjusts consistency of the frequency response curve of the screen sound production component when playing an audio signal during normal use, to make a frequency response of the electronic device consistent. Therefore, better hearing experience is provided for a user, and user experience is improved.

Figure 8A:
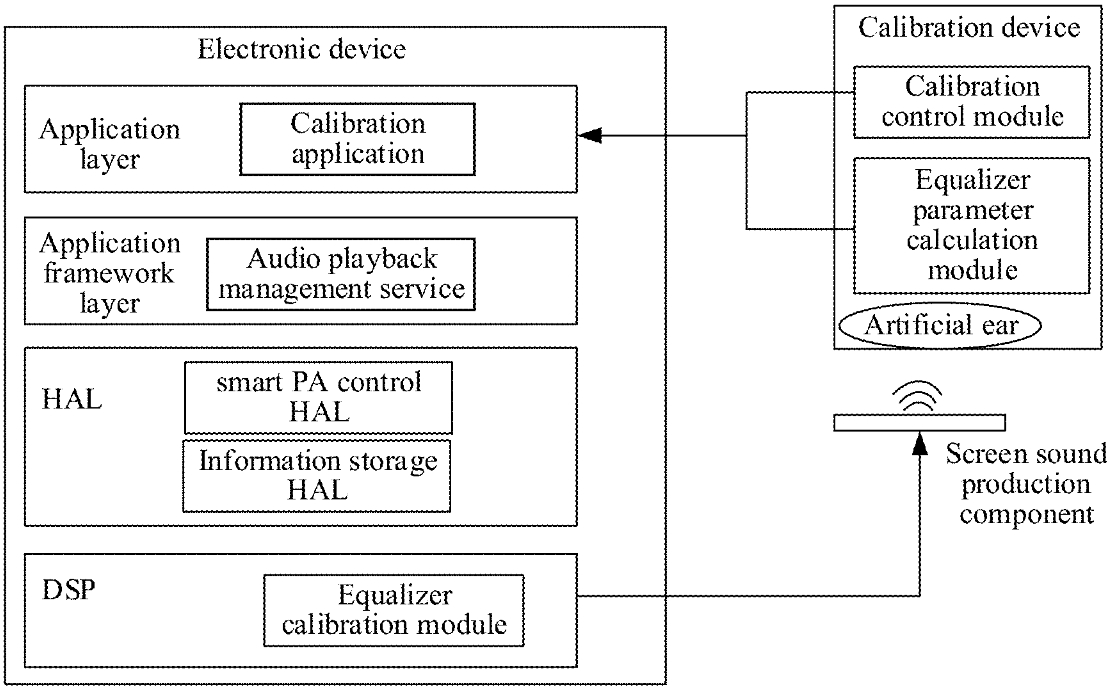
FIG. 8A is a block diagram of system structures of an electronic device and a calibration device in a calibration system according to an embodiment of this application.
Figure 8B:
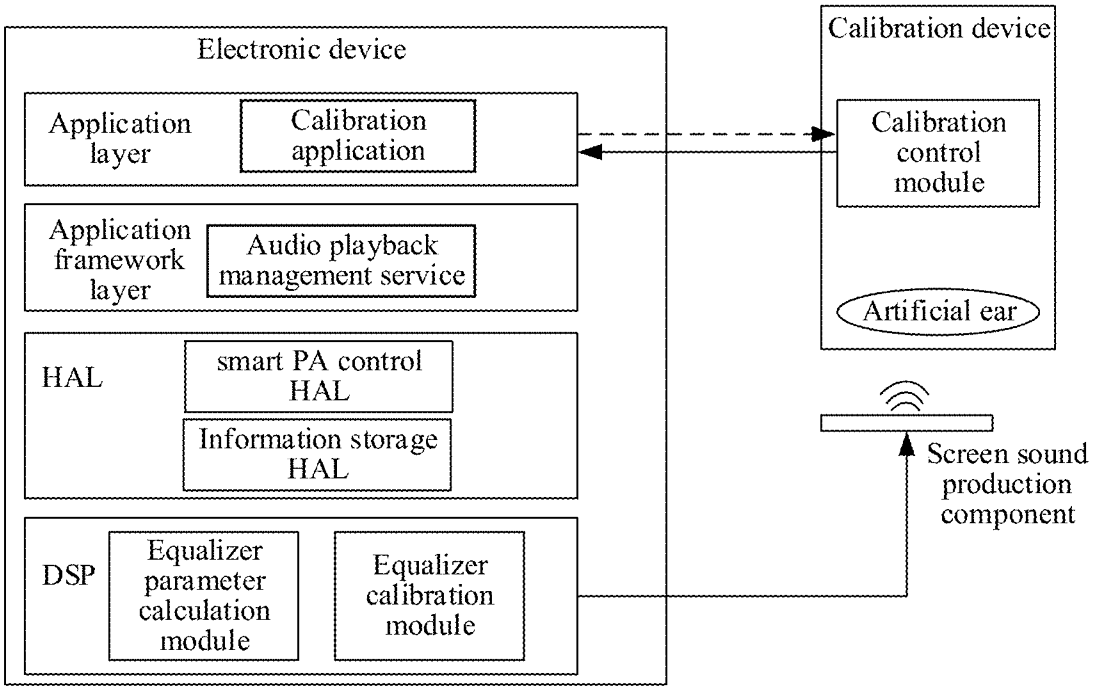
FIG. 8B is a block diagram of system structures of an electronic device and a calibration device in another calibration system according to an embodiment of this application.
Figure 9:
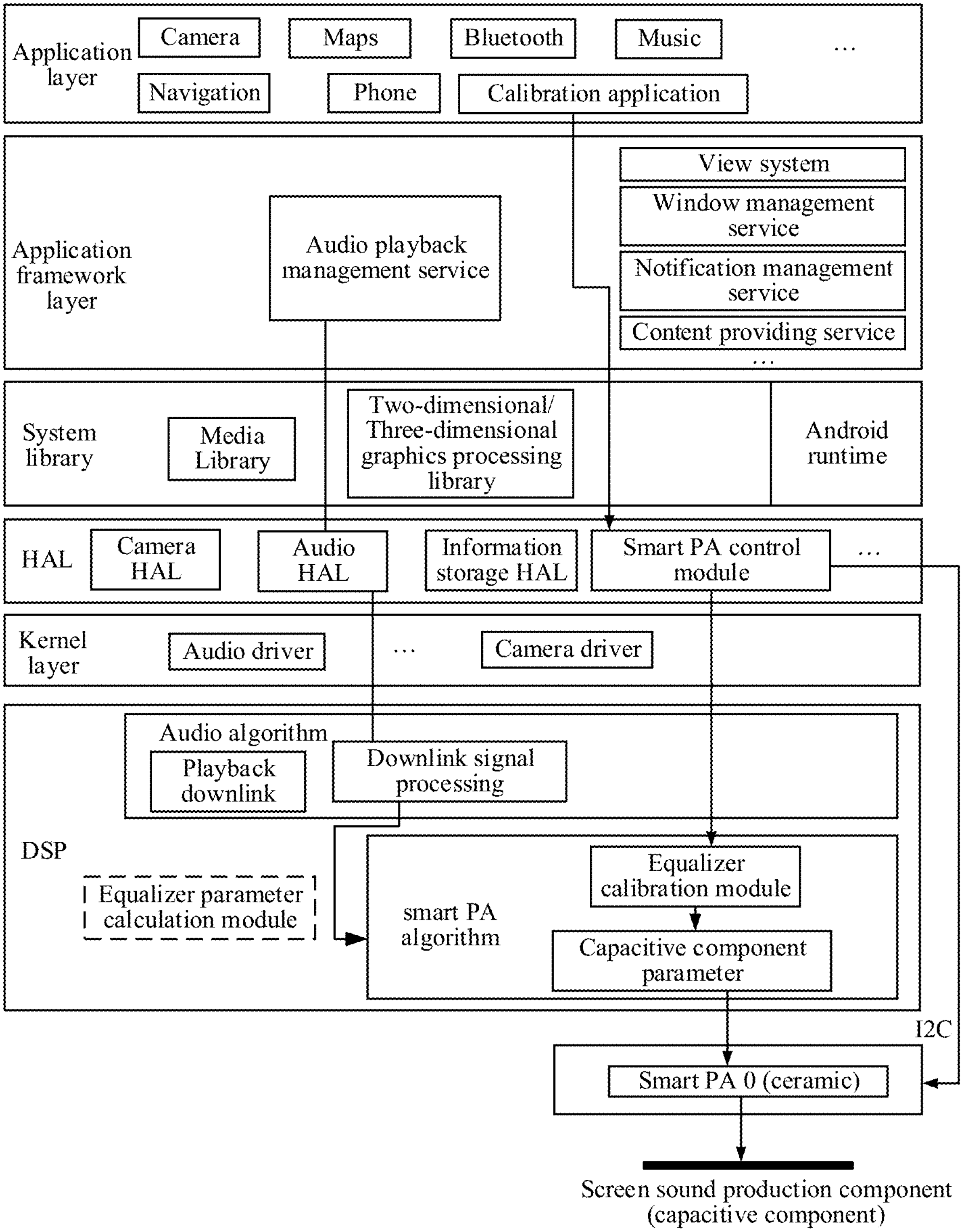
FIG. 9 is a block diagram of a software structure of an electronic device according to an embodiment of this application.

FIG. 8A and FIG. 8B are block diagrams of systems of the electronic device and the calibration device in the calibration system according to an embodiment of this application. FIG. 9 is a block diagram of a software structure of the electronic device according to an embodiment of this application. The following respectively describes system structures of the electronic device and the calibration device.

For the Electronic Device

Refer to FIG. 8A, FIG. 8B, and FIG. 9. The system structure of the electronic device (for example, a mobile phone) may use a layered architecture, an event-driven architecture, a micro-core architecture, a micro-service architecture, or a cloud architecture. In this embodiment of this application, an Android system of the layered architecture is used as an example to illustrate a software structure of the mobile phone. Certainly, in another operating system, a function implemented by each function module is similar to that in this embodiment of this application.

Software is divided into several layers by the layered architecture, and each layer has a clear role and task. The layers communicate with each other through a software interface. In some embodiments, the Android system is divided into five layers: an application layer, an application framework layer (framework), an Android runtime (Android runtime) and system library (libraries) layer, a HAL (hardware abstraction layer, hardware abstraction layer), and a kernel layer (kernel) from top down.

The application layer may include a series of application packages. As shown in FIG. 9, an application (application) such as Phone, Memos, Browser, Contacts, Camera, Gallery, Calendar, Maps, Bluetooth, Music, Video, and Messages may be installed at the application layer. In this embodiment of this application, a calibration application may further be installed at the application layer. In some implementations, the calibration application may receive a calibration signal (also referred to as a test instruction) from the calibration device, so that the electronic device performs an operation of playing the test audio signal after receiving the calibration signal, to calibrate a frequency response of the audio signal played by the screen sound production component. In some other implementations, the calibration application may send a calibration signal (also referred to as a test instruction) to the calibration device, and after sending the calibration signal, control the electronic device to play the test audio signal, so that after receiving the calibration signal, the calibration device starts an acquisition device (for example, an artificial ear) to acquire the test audio signal played by the electronic device.

For example, after the calibration application receives the calibration signal from the calibration device, or the calibration application sends the calibration signal to the calibration device, the calibration application may send a test command to a corresponding HAL (for example, a smart PA control HAL) in the HAL, so that the smart PA control HAL controls the electronic device to play the test audio signal.

The application framework layer provides an application programming interface (application programming interface, API) and a programming framework for the application at the application layer. The application framework layer includes some predefined functions. As shown in FIG. 9, an audio playback management service is disposed in the application framework layer. The audio playback management service may be used to initialize an audio and video player, obtain a volume of current audio, adjust a volume of audio playback, increase a sound effect, and the like.

In addition, the application framework layer may further include a window management service, a content providing service, a view system, a resource management service, a notification management service, and the like. This is not limited in this embodiment of this application.

For example, the window management service is used to manage a window program. The window management service may obtain a size of a display, determine whether there is a status bar, lock a screen, take a screenshot, and the like. The content providing service is used to store and obtain data and make the data accessible to an application. The data may include a video, an image, audio, calls that are made and received, a browsing history and bookmarks, a phonebook, and the like. The view system may be configured to construct a display interface of an application. Each display interface may include one or more controls. Generally, the control may include interface elements such as an icon, a button, a menu, a tab, a text box, a dialog box, a status bar, a navigation bar, and a widget (widget). The resource management service provides various resources such as a localized character string, an icon, a picture, a layout file, and a video file for an application. The notification management service enables an application to display notification information in a status bar, which may be used to convey a notification-type message and may automatically disappear after a short stay without user interaction. For example, the notification management service is used to notify download completion or as a message reminder. The notification manager may alternatively be a notification that appears in the status bar at the top of the system in a form of a chart or scroll bar text, such as a notification for an application running in the background, or a notification that appears on the screen in a form of a dialog window: For example, text information is displayed in the status bar, a prompt tone is played, vibration occurs, or an indicator light blinks.

As shown in FIG. 9, the HAL of the mobile phone provides HALs corresponding to different hardware modules of the mobile phone, for example, an Audio HAL, a Camera HAL, a Wi-Fi HAL, the smart PA control HAL, and an information storage HAL.

The Audio HAL may correspond to an audio output component (for example, a speaker or the screen sound production component) through an audio driver of the kernel layer. When a plurality of audio output components (for example, a plurality of speakers or screen sound production components) are disposed in the mobile phone, the plurality of audio output components separately correspond to a plurality of audio drivers of the kernel layer.

The smart PA control HAL corresponds to a smart PA hardware circuit through a smart PA algorithm in a DSP. For example, when the smart PA control HAL receives the test command delivered by the calibration application in the application layer, the smart PA control HAL may control the smart PA algorithm to run, to configure the smart PA algorithm to play the test audio signal. When the smart PA control HAL receives a call instruction delivered by the Phone application in the application layer or a music playback instruction delivered by the Music application, the smart PA control HAL may control the smart PA algorithm to run, to configure the smart PA algorithm to play a voice signal of the other party or an audio signal corresponding to music. In addition, the smart PA control HAL may further control the smart PA hardware circuit (for example, a hardware circuit (smart PA 0) of the screen sound production component) to be turned on through an I2C signal, to play the test audio signal through the screen sound production component.

The information storage HAL corresponds to a non-volatile storage medium (for example, a memory) of the electronic device, and is used to store an equalizer parameter (that is, the calibration parameter) obtained by the electronic device or the calibration device through calculation to the non-volatile storage medium of the electronic device. For example, when the electronic device obtains the equalizer parameter (that is, the calibration parameter) through calibration, or the electronic device receives the equalizer parameter (that is, the calibration parameter) obtained by the calibration device through calculation, the information storage HAL may store the equalizer parameter to the non-volatile storage medium of the electronic device. The equalizer parameter is used to adjust smoothness of a frequency response curve when the electronic device plays a normal audio signal, to reduce a difference between the frequency response curve of the actually played audio signal and a standard frequency response curve and improve quality of the audio signal played by the electronic device, to improve hearing experience of the user.

The Android runtime includes a kernel library and a virtual machine. The Android runtime is responsible for scheduling and managing the Android system.

The core library includes two parts: one part is a function that needs to be invoked by a Java language, and the other part is a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports play back and recording in a plurality of common audio and video formats, as well as static image files and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is located below the HAL, and is a layer between hardware and software. In addition to the foregoing audio driver, the kernel layer may further include a display driver, a camera driver, a sensor driver, and the like. This is not limited in this embodiment of this application.

It should be noted that below the kernel layer is the hardware circuit. For example, in this embodiment of this application, a digital signal processing (digital signal processing, DSP) chip is included, and a smart PA algorithm module, an audio algorithm module, and the like run on the DSP chip.

The smart PA algorithm module includes an equalizer calibration module. When the smart PA control HAL receives the test command delivered by the calibration application, the information storage HAL may detect whether the equalizer parameter (that is, the calibration parameter) is stored in the non-volatile storage device. If the information storage HAL does not detect the equalizer parameter, the information storage HAL cannot send the equalizer parameter to the equalizer calibration module, or the information storage HAL sends a null equalizer parameter to the equalizer calibration module, and the equalizer calibration module does not run. In this case, the smart PA algorithm module directly plays the original test audio signal.

During normal use of the electronic device, when an audio related application (for example, the Phone application or the Music application) runs in response to an operation of the user, an audio playback instruction is delivered to the smart PA control HAL. The smart PA control HAL receives the audio playback instruction, and the information storage HAL may detect whether the equalizer parameter (that is, the calibration parameter) is stored in the non-volatile storage device. If the information storage HAL detects the equalizer parameter, the information storage HAL obtains the calibration parameter from the non-volatile storage medium, and sends the equalizer parameter to the equalizer calibration module. In this case, the equalizer calibration module receives the calibration parameter, and determines a parameter such as an equalizer type, a central frequency, and a frequency response gain based on the calibration parameter. In addition, the equalizer calibration module may further convert a to-be-played audio signal into a frequency domain signal, perform frequency domain gain calibration by using a plurality of stages of equalizers in the equalizer calibration module, and send a calibrated audio signal to the smart PA hardware circuit, so that the screen sound production component plays the calibrated audio signal.

In a possible implementation, as shown in FIG. 8B and FIG. 9, an equalizer parameter calculation module further runs on the DSP chip. After the calibration device acquires the test audio signal played by the electronic device, the calibration device may send an acquired sound signal (that is, the first audio signal) to the calibration application. Then, the calibration application sends the first audio signal to the equalizer parameter calculation module through the HAL (for example, the smart PA control HAL). After receiving the first audio signal, the equalizer parameter calculation module may determine the equalizer parameter (that is, the calibration parameter) based on comparison between the frequency response of the first audio signal and the standard frequency response of the transmission audio signal.

Certainly, the equalizer parameter calculation module may alternatively be a module in the calibration application. This is not specifically limited in this application.

For the Calibration Device

In an implementation, refer to FIG. 8A. When the electronic device does not include the equalizer parameter calculation module, the calibration device includes a calibration control module, the equalizer parameter calculation module, and the artificial ear. The calibration control module is configured to communicate with the electronic device. For example, the calibration control module may be configured to send the test instruction (that is, the calibration signal) to the electronic device to instruct the electronic device to play the test audio signal through the smart PA, and after sending the test instruction, control the artificial ear to start sound signal acquisition. For another example, the calibration control module may further be configured to send the calibration parameter output by the equalizer parameter calculation module to the electronic device, to indicate the electronic device to store the calibration parameter. For another example, the calibration control module may further be configured to receive the test instruction (that is, the calibration signal) sent by the electronic device, and when receiving the test instruction, control the artificial ear to start sound signal acquisition.

The artificial ear is configured to acquire the sound signal (that is, the first audio signal) output by the electronic device when playing the test audio signal, and convert the acquired sound signal into an electrical signal for transmission to the equalizer parameter calculation module.

The equalizer parameter calculation module is configured to receive the first audio signal, and after receiving the first audio signal, determine the equalizer parameter (that is, the calibration parameter) based on comparison between the frequency response of the first audio signal and the standard frequency response of the transmission audio signal.

In another implementation, refer to FIG. 8B. When the electronic device includes the equalizer parameter calculation module, the calibration device includes only a calibration control module and the artificial ear. The calibration control module is configured to communicate with the electronic device. For example, the calibration control module may be configured to send the test instruction (that is, the calibration signal) to the electronic device to instruct the electronic device to play the test audio signal through the smart PA, and after sending the test instruction, control the artificial ear to start sound signal acquisition. For another example, the calibration control module may further be configured to receive the test instruction (that is, the calibration signal) sent by the electronic device, and when receiving the test instruction, control the artificial ear to start sound signal acquisition. For another example, the calibration control module may further be configured to send the first audio signal acquired by the artificial ear to the electronic device, so that the equalizer parameter calculation module in the electronic device determines the equalizer parameter (that is, the calibration parameter) based on comparison between the frequency response of the first audio signal and the standard frequency response of the transmission audio signal.

Figure 10A:
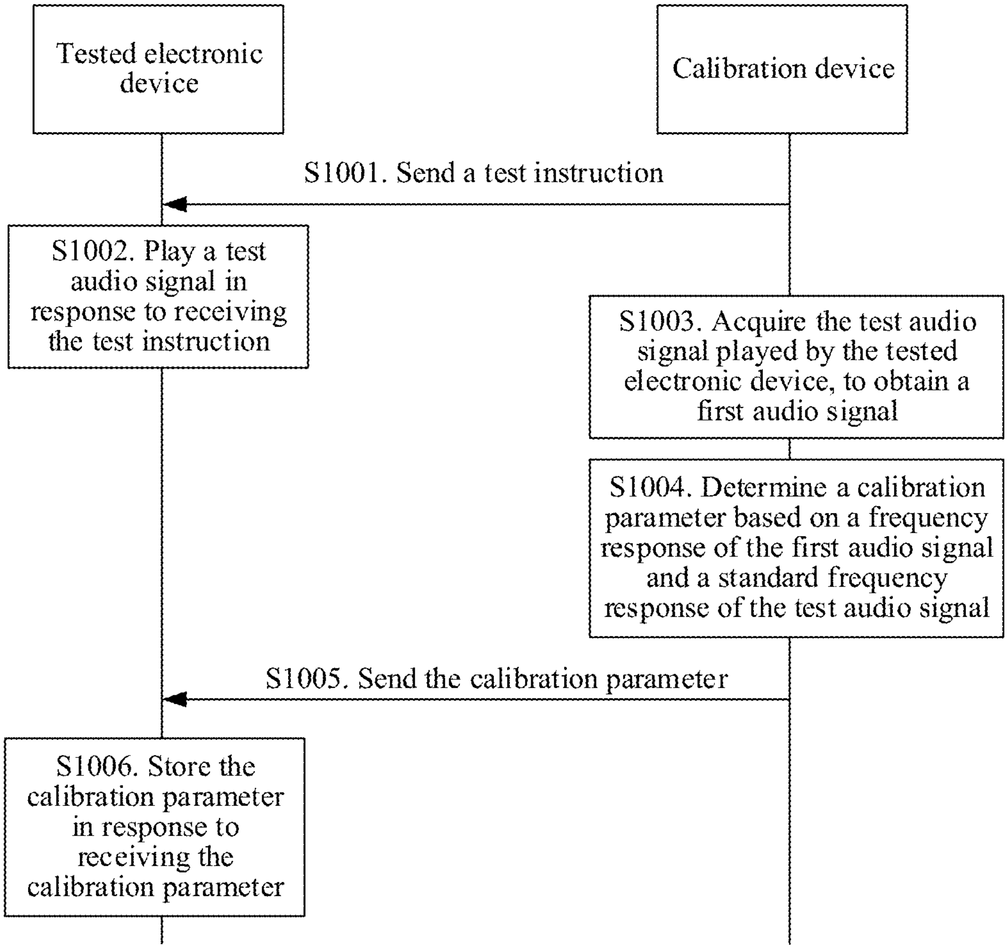
FIG. 10A is a flowchart of a frequency response consistency calibration method according to an embodiment of this application.

The following describes in detail, with reference to the flowchart, the frequency response consistency calibration method provided in this embodiment of this application. In some embodiments, as shown in FIG. 10A, the frequency response consistency calibration method is applied to the calibration system shown in FIG. 8A. A tested electronic device is in communication connection to the calibration device. The method includes the following steps.

S1001: The calibration device sends a test instruction to the tested electronic device.

The test instruction instructs the tested electronic device to play a test audio signal. The test audio signal may be a frequency sweeping signal in full frequency domain, or a frequency sweeping signal within a specific frequency range (for example, a frequency sweeping signal within a frequency range that the artificial ear can hear, for example, 20 Hz to 20000 Hz).

After the calibration device is in communication connection to the tested electronic device, a user may press a test button of the calibration device, to implement sending of the test instruction by the calibration device to the tested electronic device.

It should be noted that when frequency response consistency calibration needs to be performed on the electronic device, the tested electronic device may send a test instruction to the calibration device. For example, the tested electronic device receives a tap operation performed by a user on a calibration control in a calibration application, and sends the test instruction to the calibration device.

S1002: The tested electronic device plays the test audio signal in response to receiving the test instruction.

For example, when receiving the test instruction, the calibration application of the tested electronic device may send the test instruction to a smart PA control HAL in a HAL. When receiving the test instruction, the smart PA control HAL controls a smart PA algorithm module to run, to control a smart PA hardware circuit to play the test audio signal. In addition, the smart PA control HAL further controls the smart PA hardware circuit (for example, a hardware circuit (smart PA 0) of a screen sound production component) to be turned on through an I2C signal, to play the test audio signal through the screen sound production component.

It should be noted that the test audio signal played by the tested electronic device in such case is a signal that is not calibrated by an equalizer calibration module. After the uncalibrated test audio signal is played, a frequency response curve of the tested electronic device during audio playback can be represented. Then, the uncalibrated frequency response curve is compared with a standard frequency response curve of the test audio signal to determine a frequency point with a great frequency response deviation and a frequency response gain. Therefore, parameters (that is a calibration parameter) of a plurality of stages of equalizers in the equalizer calibration module are determined based on the frequency point with the great deviation and the frequency response gain.

In addition, if the tested electronic device sends the test instruction to the calibration device, the electronic device may play the test audio signal after sending the test instruction to the calibration device.

S1003: The calibration device acquires the test audio signal played by the tested electronic device, to obtain a first audio signal.

For example, after the calibration device sends the test instruction to the tested electronic device, the calibration device may start the artificial ear. Certainly, if the tested electronic device sends the test instruction to the calibration device, the calibration device may start the artificial ear after receiving the test instruction sent by the electronic device.

When the tested electronic device plays the test audio signal through the screen sound production component, the calibration device may acquire, through the artificial ear, the test audio signal played by the tested electronic device, to obtain the first audio signal. The artificial ear may convert the received first audio signal into an electrical signal for sending to the equalizer parameter calculation module.

S1004: The calibration device determines the calibration parameter based on a frequency response of the first audio signal and a standard frequency response of the test audio signal. The calibration parameter includes a quantity of to-be-calibrated frequency bands (that is, a quantity of filters), a filter type corresponding to each to-be-calibrated frequency band, a central frequency of a filter corresponding to each to-be-calibrated frequency band, an incremental gain of the filter corresponding to each to-be-calibrated frequency band, and a Q value of the filter corresponding to each to-be-calibrated frequency band.

Generally, a range of a quantity of sub-bands that can be supported to be calibrated may be preset in the equalizer parameter calculation module of the calibration device. For example, the equalizer calibration module may support calibration of n to m sub-bands (that is, may support calibration of n to m to-be-calibrated frequency bands).

When the electronic device plays an audio signal, audio signals within a partial frequency range are not audible to human ears. Therefore, such signals cannot affect hearing experience of the user, and may not require frequency response calibration. Therefore, a frequency range within which calibration is required may be preset, to improve frequency response calibration efficiency. For example, a frequency range of a frequency response required to be calibrated may be preset to be from a first frequency point f1 to a second frequency point f2. The first frequency point f1 is a lowest frequency required to be calibrated. The second frequency point f2 is a highest frequency required to be calibrated.

In addition, an expected calibration discrete range of the electronic device may be preset to ±x dB. That is, when the frequency response of the electronic device deviates from a normal frequency response by more than x dB at a specific frequency point, it indicates that the frequency point is required to be calibrated.

Figure 10B:
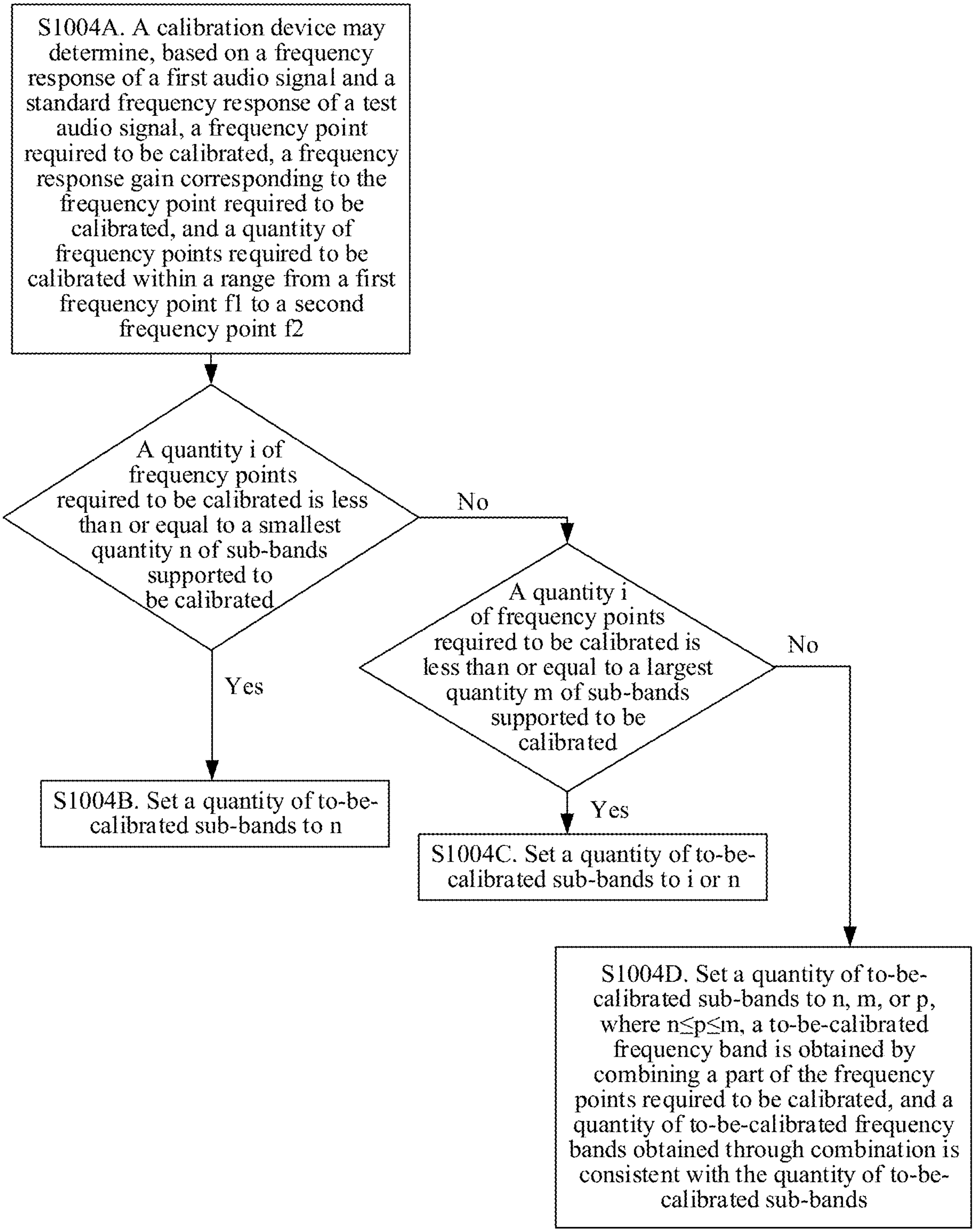
FIG. 10B is a flowchart of step S1004 in FIG. 10A.

In this embodiment of this application, as shown in FIG. 10B, S1004 may include S1004A to S1004D.

S1004A: The calibration device may determine, based on the frequency response of the first audio signal and the standard frequency response of the test audio signal, a frequency point required to be calibrated, a frequency response gain corresponding to the frequency point required to be calibrated, and a quantity of frequency points required to be calibrated within the range from the first frequency point f1 to the second frequency point f2. The frequency point required to be calibrated is a frequency point at which a difference between the frequency response of the first audio signal and the frequency response of the test audio signal is greater than the preset expected calibration discrete range (that is, x dB). The frequency response gain corresponding to the frequency point required to be calibrated is a difference between the frequency response of the first audio signal and the frequency response of the test audio signal at the frequency point required to be calibrated. The quantity of frequency points required to be calibrated is a total quantity of frequency points required to be calibrated.

Figure 11:
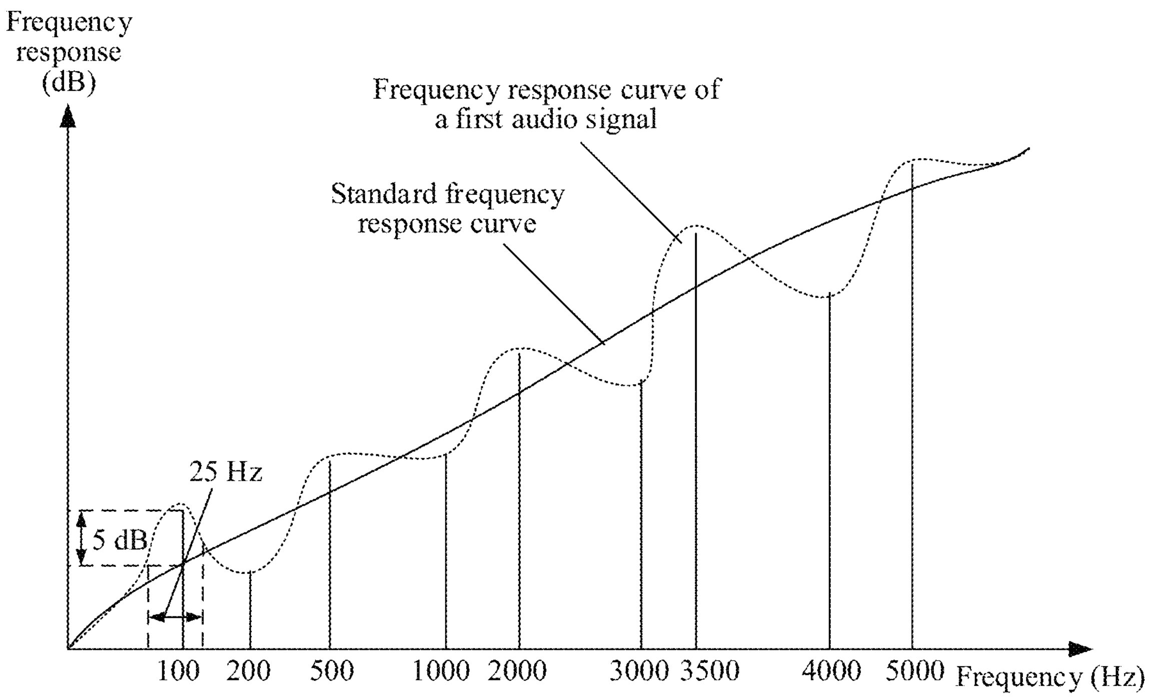
FIG. 11 is a diagram of comparison between a frequency response curve of a first audio signal and a standard frequency response curve of a test audio signal according to an embodiment of this application.

For example, FIG. 11 is a diagram of comparison between a frequency response curve of the first audio signal and a standard frequency response curve of the test audio signal according to an embodiment of this application. As shown in FIG. 11, it can be seen from comparison between the frequency response curve of the first audio signal and the standard frequency response curve of the test audio signal that the frequency response curve of the first audio signal is greatly different from the standard frequency response curve of the test audio signal.

As shown in FIG. 11, based on a characteristic of the frequency response curve of the first audio signal, the frequency response curve of the first audio signal greatly fluctuates. In this case, based on the frequency response curve of the first audio signal, frequencies at turning locations (that is, peak and valley locations) of the frequency response curve may be determined as frequency points that may be required to be calibrated. For example, frequency points 100 Hz, 200 Hz, 500 Hz, 1000 Hz, 2000 Hz, 3000 Hz, 3500 Hz, 4000 Hz, and 5000 Hz in the frequency response curve shown in FIG. 11 are frequency points required to be calibrated.

After the frequency point that may be required to be calibrated is obtained, a frequency response of the first audio signal at the frequency point may be compared with a frequency response corresponding to the frequency point in the standard frequency response curve of the test audio signal for calculation. For example, when a difference between the frequency response of the first audio signal and a frequency response in the standard frequency response curve of the test audio signal at the frequency point 100 Hz is 5 dB, if the preset expected standard discrete range is ±2 dB, 5 dB is greater than 2 dB, the frequency point 100 Hz may be determined as a frequency point required to be calibrated, and it may be determined that a frequency response gain at the frequency point 100 Hz is 5 dB.

Calculation may be performed in the foregoing manner on each frequency point that may be required to be calibrated, to determine the frequency point required to be calibrated, the frequency response gain corresponding to the frequency point required to be calibrated, and the quantity of frequency points required to be calibrated.

In this case, the calibration parameter may be determined based on the frequency point required to be calibrated, the frequency response gain corresponding to the frequency point required to be calibrated, and the quantity of frequency points required to be calibrated within the range from the first frequency point f1 to the second frequency point f2. That is, a quantity of filters, a filter type, a central frequency of a filter, a gain of the filter, a Q value of the filter, and the like may be determined.

Because the equalizer calibration module may support calibration of n to m sub-bands, based on different quantities of frequency points required to be calibrated, quantities of filters and filter types are not completely the same.

The following describes a method for determining the calibration parameter in different cases.

In a first case, a quantity i of frequency points required to be calibrated is less than or equal to a smallest quantity n of sub-bands supported to be calibrated. In this case, the following S1004B may be performed.

S1004B: Set a quantity of to-be-calibrated sub-bands to n.

One filter may be disposed for each to-be-calibrated sub-band (that is, to-be-calibrated frequency band). That is, the quantity of filters is set to n. In this case, each to-be-calibrated sub-band includes one to-be-calibrated frequency point. A central frequency of the filter corresponding to each to-be-calibrated frequency band is a frequency of the corresponding to-be-calibrated frequency point. The to-be-calibrated frequency point is set to n frequency points at which differences between the frequency response of the first audio signal and the frequency response of the test audio signal are greatest. A type of each filter is set to a peak filter. A peak gain of the filter corresponding to each to-be-calibrated sub-band is a frequency response gain corresponding to the to-be-calibrated frequency point.

In a second case, a quantity i of frequency points required to be calibrated is greater than a smallest quantity n of sub-bands supported to be calibrated and less than or equal to a largest quantity m of sub-bands supported to be calibrated. In this case, the following S1004C may be performed.

S1004C: Set a quantity of to-be-calibrated sub-bands to i or n.

In some embodiments, because n<i≤m, the quantity of to-be-calibrated sub-bands may be set to i, that is, filter data is set to i. In this case, a type of each filter is set to a peak filter. In this case, each to-be-calibrated sub-band includes one to-be-calibrated frequency point. A central frequency of a filter corresponding to each to-be-calibrated frequency band is a frequency of the corresponding to-be-calibrated frequency point. All of the i frequency points required to be calibrated are configured as to-be-calibrated frequency points. A peak gain of the filter corresponding to each to-be-calibrated sub-band is a frequency response gain corresponding to the to-be-calibrated frequency point.

In some embodiments, the frequency points required to be calibrated may be combined. For example, adjacent frequency points are combined. For example, the two frequency points 100 Hz and 200 Hz in FIG. 11 may be combined into one frequency band. After adjacent frequency points are combined to obtain n to-be-calibrated frequency bands, combination of adjacent frequency points is stopped. In this case, the quantity of to-be-calibrated sub-bands may be set to n, that is, the quantity of filters is set to n. A peak gain of the filter corresponding to each to-be-calibrated sub-band is an average gain of frequency response gains corresponding to frequency points in each to-be-calibrated frequency band. The type of each filter may be set to a peak filter.

In a third case, a quantity i of frequency points required to be calibrated is greater than a largest quantity m of sub-bands supported to be calibrated. In this case, the following S1004D may be performed.

S1004D: Set a quantity of to-be-calibrated sub-bands to n, m, or p, where n≤p≤m. The to-be-calibrated frequency band is obtained by combining a part of the frequency points required to be calibrated. The quantity of to-be-calibrated frequency bands obtained through combination is consistent with the quantity of to-be-calibrated sub-bands.

In this case, the quantity i of frequency points required to be calibrated is greater than the largest quantity m of sub-bands supported to be calibrated, and adjacent frequency points need to be combined.

In some embodiments, the quantity of to-be-calibrated sub-bands may be set to n, that is, the quantity of filters is set to n. In this case, n to-be-calibrated frequency bands are obtained by combining adjacent frequency points. For example, it is assumed that the smallest quantity n of sub-bands supported to be calibrated is 6, and the largest quantity m of sub-bands supported to be calibrated is 12. If the quantity i of frequency points required to be calibrated is greater than 12, for example, i=13, the frequency points required to be calibrated may be combined in pairs to obtain six to-be-calibrated frequency bands and one single frequency point. In this case, the one single frequency point may be combined with an adjacent to-be-calibrated frequency band, to finally obtain six to-be-calibrated frequency bands (one of the to-be-calibrated frequency bands includes three to-be-calibrated frequency points).

After adjacent frequency points are combined to obtain n to-be-calibrated frequency bands, if a lowest frequency point of a lowest to-be-calibrated frequency band is f1 (f1 is a preset lowest frequency required to be calibrated), and a quantity of to-be-calibrated frequency points in the lowest to-be-calibrated frequency band is greater than or equal to 2, a filter of a sub-band corresponding to the to-be-calibrated frequency band is set to a low shelf filter. A central frequency of the filter is set to a highest frequency point of the to-be-calibrated frequency band. A peak gain of the filter corresponding to each to-be-calibrated sub-band is set to an average gain of frequency response gains corresponding to frequency points in the to-be-calibrated frequency band.

If a highest frequency point of a highest to-be-calibrated frequency band is f2 (f2 is a preset highest frequency required to be calibrated), and a quantity of to-be-calibrated frequency points in the highest to-be-calibrated frequency band is greater than or equal to 2, a filter of a sub-band corresponding to the to-be-calibrated frequency band is set to a high shelf filter. A central frequency of the filter is set to a lowest frequency point of the to-be-calibrated frequency band. A peak gain of the filter corresponding to each to-be-calibrated sub-band is set to an average gain of frequency response gains corresponding to frequency points in the to-be-calibrated frequency band.

When the foregoing case is satisfied, filters of sub-bands corresponding to remaining n−2 to-be-calibrated frequency bands of the n to-be-calibrated frequency bands are all set to peak filters. A central frequency of each filter is set to a central frequency point of the corresponding to-be-calibrated frequency band. A to-be-calibrated gain is set to an average gain of frequency response gains corresponding to frequency points in the to-be-calibrated frequency band.

When the foregoing case is not satisfied, filters of sub-bands corresponding to the n to-be-calibrated frequency bands may all be set to peak filters. A central frequency of each filter is set to a central frequency point of the corresponding to-be-calibrated frequency band. A peak gain of the filter corresponding to each to-be-calibrated sub-band is set to an average gain of frequency response gains corresponding to frequency points in the to-be-calibrated frequency band.

In some embodiments, the quantity of to-be-calibrated sub-bands may be set to m, that is, the quantity of filters is set to m. In this case, m to-be-calibrated frequency bands are obtained by combining adjacent frequency points. For example, it is assumed that the smallest quantity n of sub-bands supported to be calibrated is 6, and the largest quantity m of sub-bands supported to be calibrated is 12. If the quantity i of frequency points required to be calibrated is greater than 12, for example, i=13, only two of the frequency points required to be calibrated may be combined into one to-be-calibrated frequency band, to finally obtain one to-be-calibrated frequency band and 11 to-be-calibrated frequency points.

In some embodiments, when i is less than or equal to 2 m, the frequency points required to be calibrated may be combined in pairs. For example, when i is an odd number, (i−1)/2 to-be-calibrated frequency bands and one to-be-calibrated frequency point are obtained. In this case, the quantity of to-be-calibrated sub-bands is set to (i−1)/2+1, that is, the quantity of filters is set to (i−1)/2+1. When i is an even number, i/2 to-be-calibrated frequency bands are obtained. In this case, the quantity of to-be-calibrated sub-bands may be set to i/2, that is, the quantity of filters is set to i/2.

When i is greater than 2 m, adjacent frequency points may be combined to obtain p to-be-calibrated frequency bands, n≤p≤m. In this case, the quantity of to-be-calibrated sub-bands may be set to p, that is, the quantity of filters is set to p.

After adjacent frequency points are combined to obtain m, (i−1)/2+1, i/2, or p to-be-calibrated frequency bands, the filter type, the central frequency of the filter, and the peak gain of the filter may be determined by the foregoing method for obtaining the n to-be-calibrated frequency bands. Details are not described herein again.

After the quantity of filters, the filter type, the central frequency point of the filter, and the peak gain of the filter are determined, a peak bandwidth (also referred to as a quality factor or a Q value) of the filter further needs to be determined. The peak bandwidth of the filter is obtained by dividing a filter bandwidth by the central frequency of the filter. In this embodiment of this application, the filter bandwidth may be determined based on the to-be-calibrated frequency point or frequency band. For example, as shown in FIG. 11, a filter bandwidth corresponding to the to-be-calibrated frequency point 100 Hz may be a frequency difference, for example, 25 Hz, between two frequency points that are on both sides of the to-be-calibrated frequency point 100 Hz and at which frequency response gains relative to the standard frequency response are x dB. Because the central frequency of the filter corresponding to the to-be-calibrated frequency point 100 Hz is 100 Hz, a peak bandwidth of the filter corresponding to the to-be-calibrated frequency point 100 Hz is 100/25=4.

Similarly, for a to-be-calibrated frequency band obtained by combining frequency points, a bandwidth of a filter corresponding to the to-be-calibrated frequency point may be a frequency difference between two frequency points that are on both sides of a central frequency point of the to-be-calibrated frequency band and at which frequency response gains relative to the standard frequency response are x dB. A peak bandwidth of the filter may be obtained through calculation based on a central frequency and the bandwidth of the filter.

S1005: The calibration device sends the calibration parameter to the tested electronic device.

After obtaining, through calculation, the quantity of filters, the central frequency of the filter, the filter type, the peak gain of the filter, and the peak bandwidth of the filter, the equalizer parameter calculation module may transmit the calibration parameter to the screen sound production component calibration control module. After receiving the calibration parameter, the screen sound production component calibration control module may send the calibration parameter to the tested electronic device.

S1006: The tested electronic device stores the calibration parameter in response to receiving the calibration parameter.

When the tested electronic device receives the calibration parameter, the tested electronic device may store the calibration parameter to the non-volatile storage medium.

The following Table 1 shows filter parameter definitions and function descriptions of the filter.

TABLE 1

Parameter definition and function description of a filter

| Parameter definition | Function |
|---|---|
| short EQBands[SMARTPA_MAX_CHANNEL]; | Quantity of EQ filters; assignment range [0, 12]; |
| short EQType[SMARTPA_MAX_CHANNEL] [SMARTPA_EQ_MAXBANDS]; | Type of the EQ filter; assignment range: 0, 1, 2, 3, 4, and 5 respectively corresponding to peak, LP, HP, LS, HS, and BP; |
| short EQfc[SMARTPA_MAX_CHANNEL] [SMARTPA_EQ_MAXBANDS]; | Central frequency of the EQ filter; assignment range [100, 20000], and precision 1 Hz; |
| short EQgain[SMARTPA_MAX_CHANNEL] [SMARTPA_EQ_MAXBANDS]; | Gain of the EQ filter; assignment range [0, 200], deviation −100, actual range [−10, 10], and precision 0.1 dB; |
| Short EQq[SMARTPA_MAX_CHANNEL] [SMARTPA_EQ_MAXBANDS]; | Q value of the EQ filter; assignment range [1, 100], actual range [0.1, 10], and precision 0.1; |

After the tested electronic device stores the calibration parameter, calibration of the consistency of the frequency response curve of the screen sound production component in the tested electronic device is completed.

Figure 12:
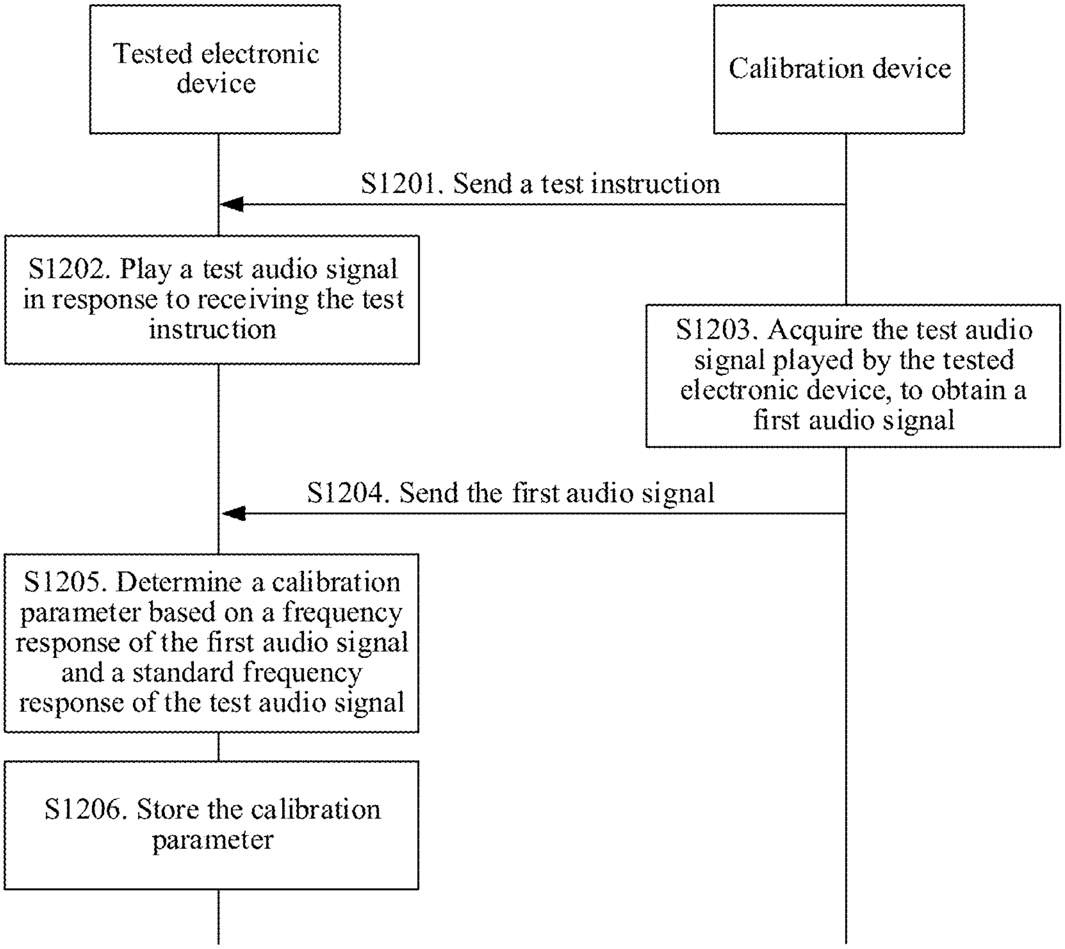
FIG. 12 is a flowchart of another frequency response consistency calibration method according to an embodiment of this application.

In some other embodiments, as shown in FIG. 12, the frequency response consistency calibration method is applied to the calibration system shown in FIG. 8B. A tested electronic device is in communication connection to the calibration device. The method includes the following steps.

S1201: The calibration device sends a test instruction to the tested electronic device. For details, refer to S1001. Details are not described herein again.

S1202: The tested electronic device plays the test audio signal in response to receiving the test instruction.

For details, refer to S1002. Details are not described herein again.

S1203: The calibration device acquires the test audio signal played by the tested electronic device, to obtain a first audio signal.

For example, after the calibration device sends the test instruction to the tested electronic device, the calibration device may start the artificial ear. Certainly, if the tested electronic device sends the test instruction to the calibration device, the calibration device may start the artificial ear after receiving the test instruction sent by the electronic device.

When the tested electronic device plays the test audio signal through a screen sound production component, the calibration device may acquire, through the artificial ear, the test audio signal played by the tested electronic device, to obtain the first audio signal.

S1204: The calibration device sends the first audio signal to the tested electronic device.

Because the calibration device only performs sound acquisition when the tested electronic device plays the test audio signal, when completing acquiring the first audio signal, the calibration device may send the first audio signal to the tested electronic device. Then, the tested electronic device determines a calibration parameter based on a frequency response of the first audio signal and a standard frequency response of the test audio signal.

S1205: The tested electronic device determines the calibration parameter based on the frequency response of the first audio signal and the standard frequency response of the test audio signal.

For details, refer to a process of determining the calibration parameter in S1004. Details are not described herein again.

S1206: The tested electronic device stores the calibration parameter.

For details, refer to S1006. Details are not described herein again.

It should be understood that during normal use of the tested electronic device, for example, when the electronic device makes a call through the screen sound production component, the electronic device detects an operation of making the call by a user, an upper-layer application (for example, a phone application) may deliver a call instruction to a smart PA control HAL. For another example, when the electronic device plays music through the screen sound production component, the electronic device detects an operation of playing music by a user, and an upper-layer application (for example, a music application) may deliver a music playback instruction to a smart PA control HAL.

When the smart PA control HAL receives the call instruction or the music playback instruction, the smart PA control HAL may control a smart PA algorithm to run, to configure the smart PA algorithm to play a voice signal of the other party or an audio signal corresponding to music. During configuration of the smart PA algorithm, the smart PA control HAL may control an information storage HAL to obtain the calibration parameter (that is, an equalizer parameter) from a non-volatile storage medium, and deliver the calibration parameter to an equalizer calibration module in the smart PA algorithm.

In the smart PA algorithm, an audio signal to be played through the screen sound production component (for example, the voice signal of the other party or the audio signal corresponding to the music) may be processed by the equalizer calibration module in the smart PA algorithm and then played through the screen sound production component. For example, for the audio signal to be played through the screen sound production component, the audio signal may be first converted into a frequency domain signal, and then frequency response calibration is performed through a plurality of stages of filters in the equalizer calibration module, to improve consistency of a frequency response curve of the screen sound production component. Therefore, consistency of sound production effects of the electronic device is ensured, and better hearing experience is provided for the user.

Figure 13:
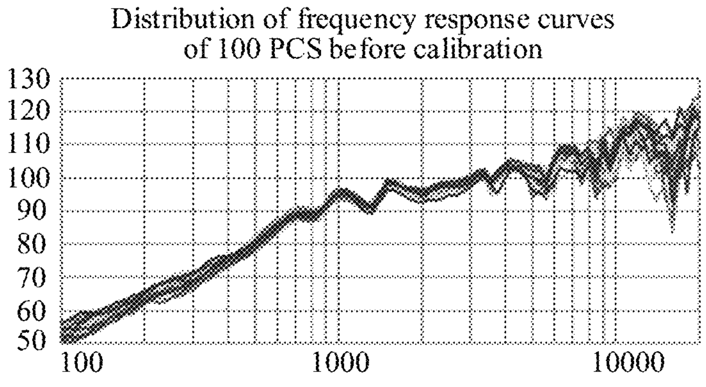
FIG. 13 is a diagram of comparison between frequency response curves of a screen sound production component before and after frequency response consistency calibration according to an embodiment of this application.
Figure 13:
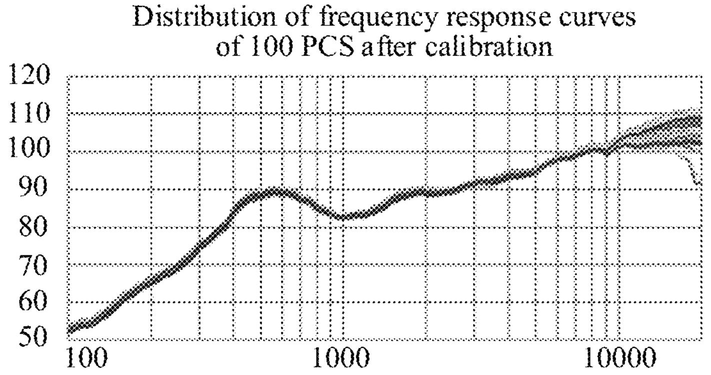

In summary, FIG. 13 is a diagram of comparison between frequency response curves of the screen sound production component before and after frequency response consistency calibration according to an embodiment of this application. (a) in FIG. 13 shows a distribution of frequency response curves of 100 electronic devices (pcs) before calibration of screen sound production components in the electronic devices. It can be seen from the figure that before calibration, frequency response curves of sound signals played through the screen sound production components of the 100 electronic devices are greatly different and high in discrete degree. However, after calibration, as shown in (b) in FIG. 13, frequency response curves of the sound signals played through the screen sound production components tend to be consistent, the frequency response curves are smoother, sound production effects of the screen sound production components are better, and hearing experience of the user is better.

In addition, an embodiment of this application further provides an audio playback method, applied to an electronic device. The audio playback method is applied to the electronic device. The electronic device includes an equalizer calibration module and a screen sound production component. The method includes: receiving an audio playback instruction, where the audio playback instruction instructs the electronic device to play a second audio signal; obtaining a calibration parameter in response to receiving the audio playback instruction, where the calibration parameter is a calibration parameter stored in the electronic device according to the method in the foregoing embodiment: adjusting a frequency response of the second audio signal through the equalizer calibration module by using the calibration parameter, to obtain a third audio signal; and playing the third audio signal through the screen sound production component.

An embodiment of this application further provides an electronic device. The electronic device includes one or more processors, a memory, and a communication module. The communication module is configured to communicate with a calibration device. The memory stores one or more computer programs. The one or more computer programs include instructions. When the instructions are executed by the processor, the electronic device is enabled to perform the method performed by the tested electronic device or by the electronic device in the foregoing embodiment. The electronic device may be the electronic device shown in FIG. 9.

An embodiment of this application further provides a calibration device. The calibration device includes a processor and a memory. The memory stores one or more computer programs. The one or more computer programs include instructions. When the instructions are executed by the processor, the calibration device is enabled to perform the method performed by the calibration device in the foregoing embodiment.

Figure 14:
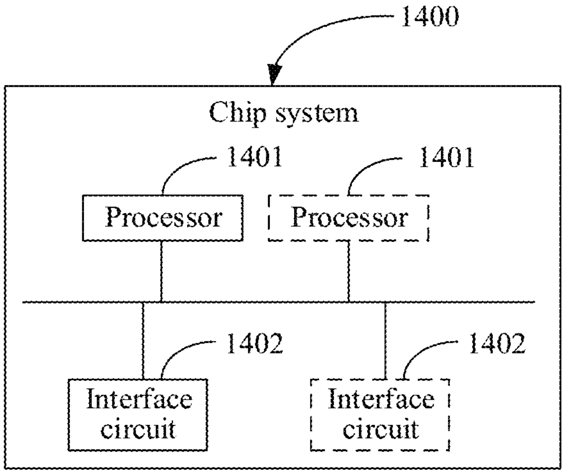
FIG. 14 is a schematic diagram of a structure of a chip system according to an embodiment of this application.

An embodiment of this application further provides a chip system. As shown in FIG. 14, the chip system 1400 may be used in an electronic device or a calibration system. The chip system 1400 includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of the electronic device). For another example, the interface circuit 1402 may be configured to send a signal to another apparatus (for example, the processor 1401).

For example, the interface circuit 1402 may read instructions stored in the memory of the electronic device, and send the instructions to the processor 1401. When the instructions are executed by the processor 1401, the electronic device (for example, the electronic device shown in FIG. 9) may be enabled to perform the functions or steps performed by the tested electronic device in the foregoing embodiment. Alternatively, when the instructions are executed by the processor 1401, the calibration device may be enabled to perform the functions or steps performed by the calibration device in the foregoing embodiment.

Certainly, the chip system may further include another discrete component. This is not specifically limited in this embodiment of this application.

Another embodiment of this application provides a computer storage medium. The computer storage medium includes computer instructions. When the computer instructions run on an electronic device, the electronic device is enabled to perform the functions or steps performed by the electronic device in the foregoing method embodiment.

Another embodiment of this application provides a computer program product. When the computer program product runs on a computer, the computer is enabled to perform the functions or steps performed by the electronic device in the foregoing method embodiment.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, and may be located in one place, or may be distributed in different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, the part contributing to the conventional technology, or all or a part of the technical solutions may be implemented in a form of a software product, for example, a program. The software product is stored in a program product, for example, a computer-readable storage medium, and includes several instructions for enabling a device (which may be a single-chip microcomputer, a chip, or the like) or a processor (processor) to perform all or some of the steps in the method described in embodiments of this application. The storage medium includes any medium capable of storing program code, such as a USB flash drive, a removable hard disk, a ROM, a RAM, a magnetic disk, or an optical disc.

For example, an embodiment of this application may further provide a computer-readable storage medium storing computer program instructions thereon. When the computer program instructions are executed by an electronic device, the electronic device is enabled to implement the audio processing method described in the foregoing method embodiment.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A frequency response consistency calibration method, wherein the method comprises:

playing, by an electronic device, a test audio signal; and storing, by the electronic device, a calibration parameter, wherein the calibration parameter is a running parameter of an equalizer calibration circuit; the calibration parameter is determined based on a frequency response of a first audio signal and a standard frequency response of the test audio signal; the first audio signal is obtained by a second device by acquiring the test audio signal played by the electronic device; and the calibration parameter is used to adjust, through the equalizer calibration circuit when the electronic device plays a second audio signal, a frequency response of the second audio signal played by the electronic device, and wherein the equalizer calibration circuit comprises a plurality of sub-band filters; the calibration parameter is parameters of the plurality of sub-band filters; and the calibration parameter comprises a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band, and wherein the method further comprises:

determining, by the electronic device based on the frequency response of the first audio signal and the standard frequency response of the test audio signal, a frequency point required to be calibrated, a quantity of frequency points required to be calibrated, and a frequency response gain corresponding to the frequency point required to be calibrated; and determining, by the electronic device, the calibration parameter based on the frequency point required to be calibrated, the quantity of frequency points required to be calibrated, and the frequency response gain corresponding to the frequency point required to be calibrated.

2. The calibration method according to claim 1, wherein the playing, by the electronic device, a test audio signal comprises:

in response to the electronic device receiving a detection instruction from the second device, playing, by the electronic device, the test audio signal; or in response to the electronic device sending a detection instruction to the second device, playing, by the electronic device, the test audio signal.

3. The method according to claim 1, wherein the test audio signal is a frequency sweeping signal in full frequency domain.

4. The method according to claim 1, wherein the frequency response of the first audio signal is obtained by performing time-frequency transform on the first audio signal.

5. The method according to claim 1, wherein the frequency point required to be calibrated is a frequency point at which a difference between the frequency response of the first audio signal and the standard frequency response of the test audio signal exceeds a preset frequency response gain; and the frequency response gain corresponding to the frequency point required to be calibrated is a difference between the frequency response of the first audio signal and the standard frequency response of the test audio signal at the frequency point required to be calibrated.

6. The method according to claim 1, wherein when the quantity of frequency points required to be calibrated is less than or equal to N, the quantity of to-be-calibrated frequency bands is N; central frequency points of the N to-be-calibrated frequency bands are N frequency points at which differences between the frequency response of the first audio signal and the frequency response of the test audio signal are greatest;

a filter type corresponding to each to-be-calibrated frequency band is a peak filter;

a central frequency of a filter corresponding to each to-be-calibrated frequency band is a frequency corresponding to a central frequency point of the to-be-calibrated frequency band; and a frequency response gain of the filter corresponding to each to-be-calibrated frequency band is a difference between the frequency response of the first audio signal and the standard frequency response of the test audio signal at the central frequency point of the to-be-calibrated frequency band, wherein N is a preset minimum quantity of sub-bands supported to be calibrated.

7. The method according to claim 1, wherein when the quantity of frequency points required to be calibrated is greater than N and less than or equal to M, the quantity of to-be-calibrated frequency bands is the quantity of frequency points required to be calibrated;

a filter type corresponding to each to-be-calibrated frequency band is a peak filter;

a central frequency of a filter corresponding to each to-be-calibrated frequency band is a frequency corresponding to each frequency point required to be calibrated; and a frequency response gain of the filter corresponding to each to-be-calibrated frequency band is a frequency response gain corresponding to each frequency point required to be calibrated, wherein N is a preset smallest quantity of sub-bands supported to be calibrated; and M is a preset largest quantity of sub-bands supported to be calibrated.

8. The method according to claim 1, wherein when the quantity of frequency points required to be calibrated is greater than M, the quantity of to-be-calibrated frequency bands is N; the to-be-calibrated frequency band is obtained by combining a part of the frequency points required to be calibrated;

in the to-be-calibrated frequency bands, except a lowest to-be-calibrated frequency band a highest to-be-calibrated frequency band, a filter type corresponding to each to-be-calibrated frequency band is a peak filter;

a central frequency of a filter corresponding to each to-be-calibrated frequency band is a frequency corresponding to a central frequency point of the to-be-calibrated frequency band; and a frequency response gain of the filter corresponding to each to-be-calibrated frequency band is an average gain of frequency response gains corresponding to all frequency points required to be calibrated in each to-be-calibrated frequency band.

9. The method according to claim 1, wherein when the quantity of frequency points required to be calibrated is greater than M, the quantity of to-be-calibrated frequency bands is N; the to-be-calibrated frequency band is obtained by combining a part of the frequency points required to be calibrated;

in a lowest to-be-calibrated frequency band of the N to-be-calibrated frequency bands, if a lowest frequency point of the lowest to-be-calibrated frequency band is f1, and a quantity of frequency points required to be calibrated in the lowest to-be-calibrated frequency band is greater than or equal to a first threshold, a filter type corresponding to the lowest to-be-calibrated frequency band is a low shelf filter;

a central frequency of a filter corresponding to the lowest to-be-calibrated frequency band is a frequency corresponding to a highest frequency point of the lowest to-be-calibrated frequency band;

a frequency response gain corresponding to the lowest to-be-calibrated frequency band is an average gain of frequency response gains corresponding to a plurality of frequency points required to be calibrated in the lowest to-be-calibrated frequency band; or in a lowest to-be-calibrated frequency band of the N to-be-calibrated frequency bands, if a lowest frequency point of the lowest to-be-calibrated frequency band is greater than f1, or a quantity of frequency points required to be calibrated in the lowest to-be-calibrated frequency band is less than a first threshold, a filter type corresponding to the lowest to-be-calibrated frequency band is a peak filter;

a central frequency of a filter corresponding to the lowest to-be-calibrated frequency band is a frequency corresponding to a central frequency point of the lowest to-be-calibrated frequency band; and a frequency response gain corresponding to the lowest to-be-calibrated frequency band is an average gain of frequency response gains corresponding to all frequency points required to be calibrated in the lowest to-be-calibrated frequency band, wherein f1 is a preset lowest frequency required to be calibrated.

10. The method according to claim 1, wherein when the quantity of frequency points required to be calibrated is greater than M, a quantity of filters is N; the to-be-calibrated frequency band is obtained by combining a part of the frequency points required to be calibrated;

in a highest to-be-calibrated frequency band of the N to-be-calibrated frequency bands, if a highest frequency point of the highest to-be-calibrated frequency band is f2, and a quantity of frequency points required to be calibrated in the highest to-be-calibrated frequency band is greater than or equal to a second threshold, a filter type corresponding to the highest to-be-calibrated frequency band is a high shelf filter;

a central frequency of a filter corresponding to the highest to-be-calibrated frequency band is a frequency corresponding to a lowest frequency point of the highest to-be-calibrated frequency band; and a frequency response gain corresponding to the highest to-be-calibrated frequency band is an average gain of frequency response gains corresponding to a plurality of frequency points required to be calibrated in the highest to-be-calibrated frequency band; or in a highest to-be-calibrated frequency band of the N to-be-calibrated frequency bands, if a highest frequency point of the highest to-be-calibrated frequency band is f2, or a quantity of frequency points required to be calibrated in the highest to-be-calibrated frequency band is less than a first threshold, a filter type corresponding to the highest to-be-calibrated frequency band is a peak filter;

a central frequency of a filter corresponding to the highest to-be-calibrated frequency band is a frequency corresponding to a central frequency point of the highest to-be-calibrated frequency band; and a frequency response gain corresponding to the highest to-be-calibrated frequency band is an average gain of frequency response gains corresponding to all frequency points required to be calibrated in the highest to-be-calibrated frequency band, wherein f2 is a preset highest frequency required to be calibrated.

11. An electronic device, wherein the electronic device comprises:

one or more processors;

a memory; and an equalizer calibration circuit;

the memory stores one or more computer programs, the one or more computer programs comprise instructions, and when the instructions are executed by the one or more processors, the electronic device is enabled to perform the following operations:

playing, by the electronic device, a test audio signal; and storing, by the electronic device, a calibration parameter, wherein the calibration parameter is a running parameter of the equalizer calibration circuit; the calibration parameter is determined based on a frequency response of a first audio signal and a standard frequency response of the test audio signal; the first audio signal is obtained by a second device by acquiring the test audio signal played by the electronic device; and the calibration parameter is used to adjust, through the equalizer calibration circuit when the electronic device plays a second audio signal, a frequency response of the second audio signal played by the electronic device, and wherein the equalizer calibration circuit comprises a plurality of sub-band filters; the calibration parameter is parameters of the plurality of sub-band filters; and the calibration parameter comprises a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band, and wherein the operations further comprise:

determining, by the electronic device based on the frequency response of the first audio signal and the standard frequency response of the test audio signal, a frequency point required to be calibrated, a quantity of frequency points required to be calibrated, and a frequency response gain corresponding to the frequency point required to be calibrated; and determining, by the electronic device, the calibration parameter based on the frequency point required to be calibrated, the quantity of frequency points required to be calibrated, and the frequency response gain corresponding to the frequency point required to be calibrated.

12. The electronic device according to claim 11, wherein the playing, by the electronic device, a test audio signal comprises:

in response to the electronic device receiving a detection instruction from the second device, playing, by the electronic device, the test audio signal; or in response to the electronic device sending the detection instruction to the second device, playing, by the electronic device, the test audio signal.

13. The electronic device according to claim 11, wherein the test audio signal is a frequency sweeping signal in full frequency domain.

14. The electronic device according to claim 11, wherein the frequency response of the first audio signal is obtained by performing time-frequency transform on the first audio signal.

15. The electronic device according to claim 11, wherein the frequency point required to be calibrated is a frequency point at which a difference between the frequency response of the first audio signal and the standard frequency response of the test audio signal exceeds a preset frequency response gain; and the frequency response gain corresponding to the frequency point required to be calibrated is a difference between the frequency response of the first audio signal and the standard frequency response of the test audio signal at the frequency point required to be calibrated.

16. The electronic device according to claim 11, wherein when the quantity of frequency points required to be calibrated is less than or equal to N, the quantity of to-be-calibrated frequency bands is N; central frequency points of the N to-be-calibrated frequency bands are N frequency points at which differences between the frequency response of the first audio signal and the frequency response of the test audio signal are greatest;

a filter type corresponding to each to-be-calibrated frequency band is a peak filter;

a central frequency of a filter corresponding to each to-be-calibrated frequency band is a frequency corresponding to a central frequency point of the to-be-calibrated frequency band; and a frequency response gain of the filter corresponding to each to-be-calibrated frequency band is a difference between the frequency response of the first audio signal and the standard frequency response of the test audio signal at the central frequency point of the to-be-calibrated frequency band, wherein N is a preset minimum quantity of sub-bands supported to be calibrated.

17. The electronic device according to claim 11, wherein when the quantity of frequency points required to be calibrated is greater than N and less than or equal to M, the quantity of to-be-calibrated frequency bands is the quantity of frequency points required to be calibrated;

a filter type corresponding to each to-be-calibrated frequency band is a peak filter;

a central frequency of a filter corresponding to each to-be-calibrated frequency band is a frequency corresponding to each frequency point required to be calibrated; and a frequency response gain of the filter corresponding to each to-be-calibrated frequency band is a frequency response gain corresponding to each frequency point required to be calibrated, wherein N is a preset smallest quantity of sub-bands supported to be calibrated; and M is a preset largest quantity of sub-bands supported to be calibrated.

18. The electronic device according to claim 11, wherein when the quantity of frequency points required to be calibrated is greater than M, the quantity of to-be-calibrated frequency bands is N; the to-be-calibrated frequency band is obtained by combining a part of the frequency points required to be calibrated;

in the to-be-calibrated frequency bands, except a lowest to-be-calibrated frequency band a highest to-be-calibrated frequency band, a filter type corresponding to each to-be-calibrated frequency band is a peak filter;

a central frequency of a filter corresponding to each to-be-calibrated frequency band is a frequency corresponding to a central frequency point of the to-be-calibrated frequency band; and a frequency response gain of the filter corresponding to each to-be-calibrated frequency band is an average gain of frequency response gains corresponding to all frequency points required to be calibrated in each to-be-calibrated frequency band.

19. The electronic device according to claim 11, wherein when the quantity of frequency points required to be calibrated is greater than M, the quantity of to-be-calibrated frequency bands is N; the to-be-calibrated frequency band is obtained by combining a part of the frequency points required to be calibrated;

in a lowest to-be-calibrated frequency band of the N to-be-calibrated frequency bands, if a lowest frequency point of the lowest to-be-calibrated frequency band is f1, and a quantity of frequency points required to be calibrated in the lowest to-be-calibrated frequency band is greater than or equal to a first threshold, a filter type corresponding to the lowest to-be-calibrated frequency band is a low shelf filter;

a central frequency of a filter corresponding to the lowest to-be-calibrated frequency band is a frequency corresponding to a highest frequency point of the lowest to-be-calibrated frequency band;

a frequency response gain corresponding to the lowest to-be-calibrated frequency band is an average gain of frequency response gains corresponding to a plurality of frequency points required to be calibrated in the lowest to-be-calibrated frequency band; or in a lowest to-be-calibrated frequency band of the N to-be-calibrated frequency bands, if a lowest frequency point of the lowest to-be-calibrated frequency band is greater than f1, or a quantity of frequency points required to be calibrated in the lowest to-be-calibrated frequency band is less than a first threshold, a filter type corresponding to the lowest to-be-calibrated frequency band is a peak filter;

a central frequency of a filter corresponding to the lowest to-be-calibrated frequency band is a frequency corresponding to a central frequency point of the lowest to-be-calibrated frequency band; and a frequency response gain corresponding to the lowest to-be-calibrated frequency band is an average gain of frequency response gains corresponding to all frequency points required to be calibrated in the lowest to-be-calibrated frequency band, wherein f1 is a preset lowest frequency required to be calibrated.

20. A non-transitory computer-readable storage medium, wherein the computer-readable storage medium stores instructions; and when the instructions run on an electronic device, the electronic device is enabled to perform the following operations:

playing, by the electronic device, a test audio signal; and storing, by the electronic device, a calibration parameter, wherein the calibration parameter is a running parameter of an equalizer calibration circuit; the calibration parameter is determined based on a frequency response of a first audio signal and a standard frequency response of the test audio signal; the first audio signal is obtained by a second device by acquiring the test audio signal played by the electronic device; and the calibration parameter is used to adjust, through the equalizer calibration circuit when the electronic device plays a second audio signal, a frequency response of the second audio signal played by the electronic device, and wherein the equalizer calibration circuit comprises a plurality of sub-band filters; the calibration parameter is parameters of the plurality of sub-band filters; and the calibration parameter comprises a quantity of to-be-calibrated frequency bands, a filter type corresponding to each to-be-calibrated frequency band, a central frequency of a filter corresponding to each to-be-calibrated frequency band, and a frequency response gain corresponding to each to-be-calibrated frequency band, and wherein the operations further comprise:

determining, by the electronic device based on the frequency response of the first audio signal and the standard frequency response of the test audio signal, a frequency point required to be calibrated, a quantity of frequency points required to be calibrated, and a frequency response gain corresponding to the frequency point required to be calibrated; and determining, by the electronic device, the calibration parameter based on the frequency point required to be calibrated, the quantity of frequency points required to be calibrated, and the frequency response gain corresponding to the frequency point required to be calibrated.

* * * * *